United States Patent
Yumiki et al.

(10) Patent No.: US 8,098,323 B2
(45) Date of Patent: Jan. 17, 2012

(54) CAMERA SYSTEM AND CAMERA BODY

(75) Inventors: Naoto Yumiki, Osaka (JP); Mitsuyoshi Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 166 days.

(21) Appl. No.: 12/670,261

(22) PCT Filed: Jul. 30, 2008

(86) PCT No.: PCT/JP2008/002046
§ 371 (c)(1),
(2), (4) Date: Feb. 17, 2010

(87) PCT Pub. No.: WO2009/016836
PCT Pub. Date: Feb. 5, 2009

(65) Prior Publication Data
US 2010/0208128 A1    Aug. 19, 2010

(30) Foreign Application Priority Data
Jul. 31, 2007   (JP) .................................. 2007-198978

(51) Int. Cl.
H04N 5/225    (2006.01)
(52) U.S. Cl. .................................. 348/360; 348/333.04
(58) Field of Classification Search ............... 348/220.1, 348/221.1, 333.01, 333.02, 333.04, 333.11, 348/360, 335
See application file for complete search history.

(56) References Cited

U.S. PATENT DOCUMENTS

| 7,787,020 | B2 * | 8/2010 | Watanabe | 348/221.1 |
| 2005/0237421 | A1 | 10/2005 | Kosugiyama | |
| 2006/0159447 | A1 | 7/2006 | Watanabe | |
| 2006/0210265 | A1 * | 9/2006 | Adachi | 396/374 |
| 2007/0188629 | A1 * | 8/2007 | Nakabe et al. | 348/231.3 |
| 2007/0253700 | A1 * | 11/2007 | Okumura | 396/358 |
| 2008/0218601 | A1 * | 9/2008 | Suemoto | 348/222.1 |

FOREIGN PATENT DOCUMENTS

| JP | 4-273671 | 9/1992 |
| JP | 11-112859 | 4/1999 |
| JP | 2001-125173 | 5/2001 |
| JP | 2003-098589 | 4/2003 |
| JP | 3546854 B | 7/2004 |
| JP | 2005-79866 | 3/2005 |
| JP | 2005-84339 | 3/2005 |
| JP | 2005-311695 | 11/2005 |
| JP | 2005-311764 | 11/2005 |
| JP | 2006-203549 | 8/2006 |
| JP | 2007-6305 | 1/2007 |

OTHER PUBLICATIONS

International Search Report of PCT Application No. PCT/JP2008/002046 dated Feb. 5, 2009.

* cited by examiner

*Primary Examiner* — Jason Whipkey
(74) *Attorney, Agent, or Firm* — Panasonic Patent Center; Dhiren Odedra; Kerry Culpepper

(57) ABSTRACT

A camera system having a camera body and an interchangeable lens is made more convenient to use. A camera system 1 includes an interchangeable lens unit 2 and a camera body 3. A body microcomputer 10 of the camera body 3 decides whether or not the interchangeable lens unit 2 is compatible with moving picture mode on the basis of lens information about the interchangeable lens unit 2. If the interchangeable lens unit 2 is not compatible with moving picture mode, the body microcomputer 10 prevents the operation of an imaging sensor 11 from being set to moving picture mode.

8 Claims, 14 Drawing Sheets

CAMERA SYSTEM AND CAMERA BODY

CROSS-REFERENCE TO RELATED APPLICATIONS

This U.S. National stage application claims priority under 35 U.S.C. §119(a) to Japanese Patent Application No. 2007-198978, filed in Japan on Jul. 31, 2007, the entire contents of which are hereby incorporated herein by reference.

TECHNICAL FIELD

The technology disclosed here relates to a camera system, and more particularly to a system used in a digital camera with an interchangeable lens.

BACKGROUND ART

Digital single lens reflex cameras, with which an optical image of a subject is converted into an electrical image signal and outputted, have rapidly grown in popularity in recent years. With these digital single lens reflex cameras, when the user views a subject through the viewfinder, the light incident on the imaging lens (that is, the subject image) is reflected by a reflecting mirror disposed along the optical path beyond the lens, which changes the optical path and sends the subject image through a pentaprism or the like to create a positive image, and guides this to an optical viewfinder. This allows the subject image that has passed through the lens to be seen through the optical viewfinder. Therefore, the position where the viewfinder optical path is formed becomes the home position of the reflecting mirror.

Meanwhile, when a lens is used for imaging, the reflecting mirror changes its position instantly and is retracted from the imaging optical path so that the viewfinder optical path is switched to the imaging optical path, and then instantly returns to its home position when imaging is over. With a single-lens reflex camera, this operation is the same regardless of whether the camera is a conventional silver halide camera or a digital camera.

One of the features of a digital camera is that imaging is performed while the user looks at a display device (such as a liquid crystal monitor), and the captured image can be checked right after it is captured. However, when a conventional single lens reflex reflecting mirror is used, a liquid crystal monitor cannot be used during imaging. Since imaging cannot be performed by using a liquid crystal monitor, the user has to look through the viewfinder during imaging, so conventional camera systems have been extremely difficult to use, especially for novices who are inexperienced in using digital cameras.

In view of this, there has been a proposal for a digital single lens reflex camera with which imaging can be performed while looking at a liquid crystal monitor (see Patent Citation 1, for example). There has also been a proposal for a digital single lens reflex camera that displays a moving picture on a display unit (see Patent Citation 2, for example).

Patent Citation 1: Japanese Laid-Open Patent Application 2001-125173

Patent Citation 2: Japanese Laid-Open Patent Application 2005-311695

DISCLOSURE OF INVENTION

In general, with a digital camera having an interchangeable lens, phase difference detection is used as the focus detection method, so the reflecting mirror must be disposed along the optical path during focusing. Therefore, with a conventional digital single lens reflex camera, a still picture can be captured in monitor imaging mode, whereas a moving picture can not.

Also, even if the camera body is compatible with moving picture imaging, the interchangeable lens unit mounted to the camera body will not necessarily be compatible with moving picture imaging. It is undesirable for an interchangeable lens unit that is not compatible with moving picture imaging to be mounted to the camera body because the systems will not match up between the interchangeable lens unit and the camera body. If an interchangeable lens that is not compatible with moving picture imaging cannot be mounted to and used on a camera body that is compatible with moving picture imaging, then the interchangeable lens unit cannot be used effectively, and the camera system is lacking in convenience.

It is an object to improve convenience in a camera system having an interchangeable lens unit and a camera body.

A camera system according to a first aspect of the present invention includes an interchangeable lens unit and a camera body. The interchangeable lens unit has an imaging optical system forming an optical image of a subject, a focus adjuster optically adjusting the focus state of the optical image, and a lens controller controlling the operation of the focus adjuster. The camera body has an imaging unit converting an optical image of the subject into an image signal and acquiring an image of the subject, a focus detector detecting the focus state of the optical image by contrast detection method on the basis of the image signal, a control interface with which control information can be inputted form the outside, and a body controller controlling the operation of the imaging unit and with which information can be exchanged with the lens controller. The lens controller has lens information related to the interchangeable lens unit. The lens information includes information related to whether or not the interchangeable lens unit is compatible with a moving picture mode. The body controller has a decision part for deciding whether or not the interchangeable lens unit is compatible with the moving picture mode on the basis of the lens information, and a mode switching controller with which the operation of the imaging unit can be set to either still picture mode or moving picture mode on the basis of the decision result of the decision part or the control information. If the decision part decides that the interchangeable lens unit is not compatible with the moving picture mode, the mode switching controller prevents the operation of the imaging unit from being set to the moving picture mode regardless of the control information.

With this camera system, whether or not the mode switching controller sets the operation of the imaging unit to moving picture mode is controlled according to whether or not the interchangeable lens unit is compatible with moving picture imaging. Therefore, even if an interchangeable lens unit that is not compatible with moving picture imaging is mounted to the camera body, system matching can be preserved, and the interchangeable lens unit can be used effectively. Specifically, the convenience of the camera system can be enhanced.

A camera system according to a second aspect is the camera system according to the first aspect, wherein information related to whether or not the interchangeable lens unit is compatible with a moving picture mode includes at least one of information related to whether or not the focus adjuster is compatible with a contrast detection method and information related to the method for driving the focus adjuster.

A camera system according to a third aspect is the camera system according to the second aspect, wherein the camera body has a first display unit with which an image acquired by the imaging unit can be displayed. The body controller has a display controller that controls the operation of the first display unit. If the decision part decides that the interchangeable lens unit is not compatible with the moving picture mode, the display controller displays that the interchangeable lens unit is not compatible with the moving picture mode.

A camera system according to a fourth aspect is the camera system according to the third aspect, wherein the camera body has a second display unit with which an image acquired by the imaging unit can be displayed, and a viewfinder that guides the image displayed by the second display unit to the outside.

A camera body according to a fifth aspect is used along with an interchangeable lens unit in a camera system. The interchangeable lens unit has an imaging optical system forming an optical image of the subject, a focus adjuster optically adjusting the focus state of the optical image, and a lens controller controlling the operation of the focus adjuster. The camera body includes an imaging unit converting an optical image of the subject into an image signal and acquiring an image of the subject, a focus detector detecting the focus state of the optical image by contrast detection method on the basis of the image signal, a control interface with which control information can be inputted form the outside, and a body controller controlling the operation of the imaging unit and with which information can be exchanged with the lens controller. The lens controller has lens information related to the interchangeable lens unit. The lens information includes information related to whether or not the interchangeable lens unit is compatible with a moving picture mode. The body controller has a decision part deciding whether or not the interchangeable lens unit is compatible with the moving picture mode on the basis of the lens information, and a mode switching controller with which the operation of the imaging unit can be set to either still picture mode or moving picture mode on the basis of the decision result of the decision part or the control information. If the decision part decides that the interchangeable lens unit is not compatible with the moving picture mode, the mode switching controller prevents the operation of the imaging unit from being set to the moving picture mode regardless of the control information.

EXPLANATION OF REFERENCE

Figure 1:
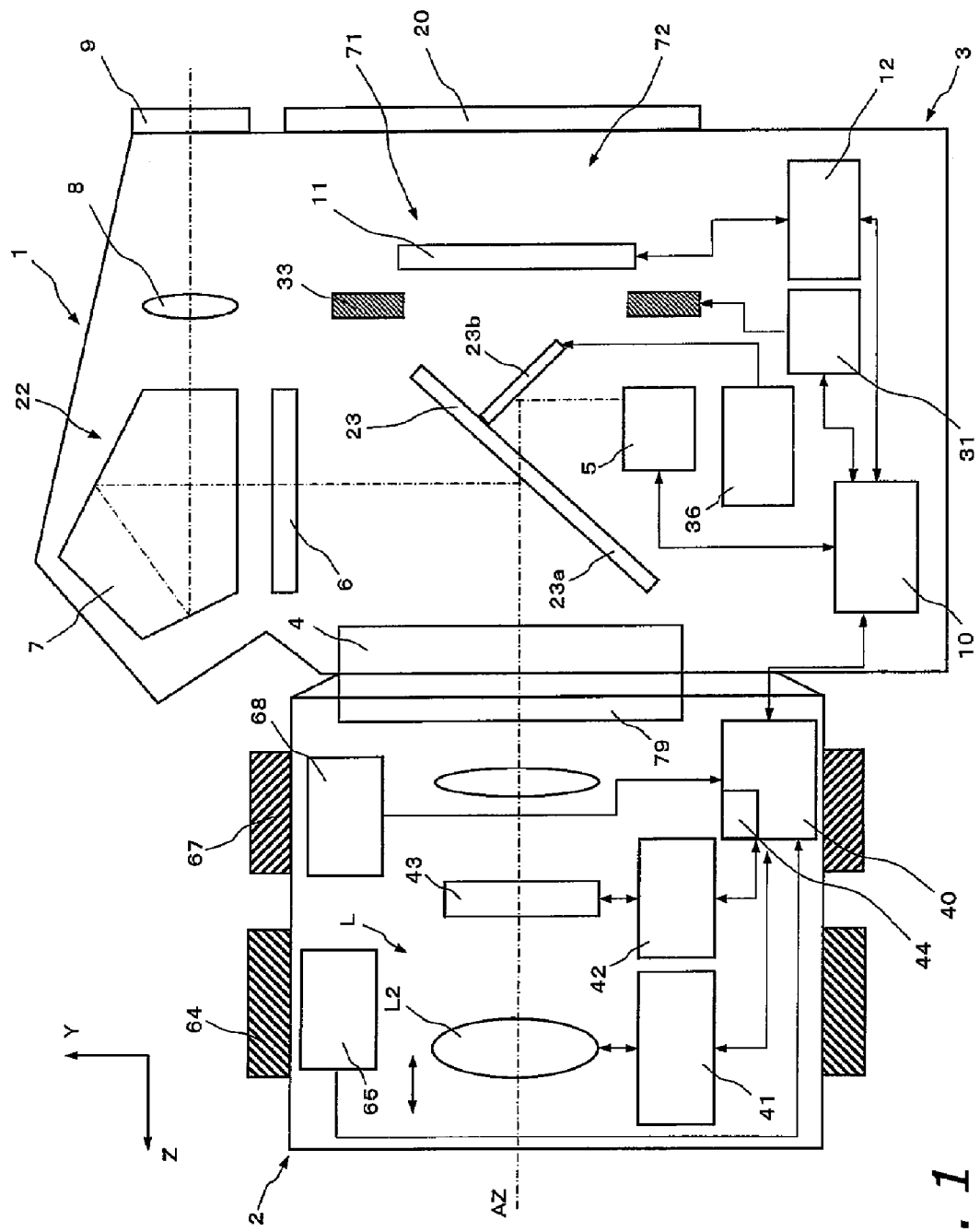
FIG. 1 is a block diagram of the constitution of a camera system.

1 camera system
2 interchangeable lens unit
3 camera body
3a case
4 body mount
10 body microcomputer (body controller)
11 image sensor (imaging unit)
12 image sensor drive controller
20 display unit (first display unit)
21 image display controller (display controller)
23 quick return mirror
25 power switch
26 mode switching dial
27 cross control key
28 menu setting button
29 set button
30 shutter control interface
31 shutter controller
33 shutter unit
34 viewfinder switching button
35 moving picture imaging button
40 lens microcomputer (lens controller)
41 focus lens group drive controller
79 lens mount
95 electronic viewfinder (second display unit)
L imaging optical system
L1 first lens group
L2 second lens group
L3 third lens group
L4 fourth lens group

BEST MODE FOR CARRYING OUT THE INVENTION

Embodiments will now be described in detail through reference to the drawings.

First Embodiment

1: Overall Configuration of Single Lens Reflex Camera System

Figure 2:
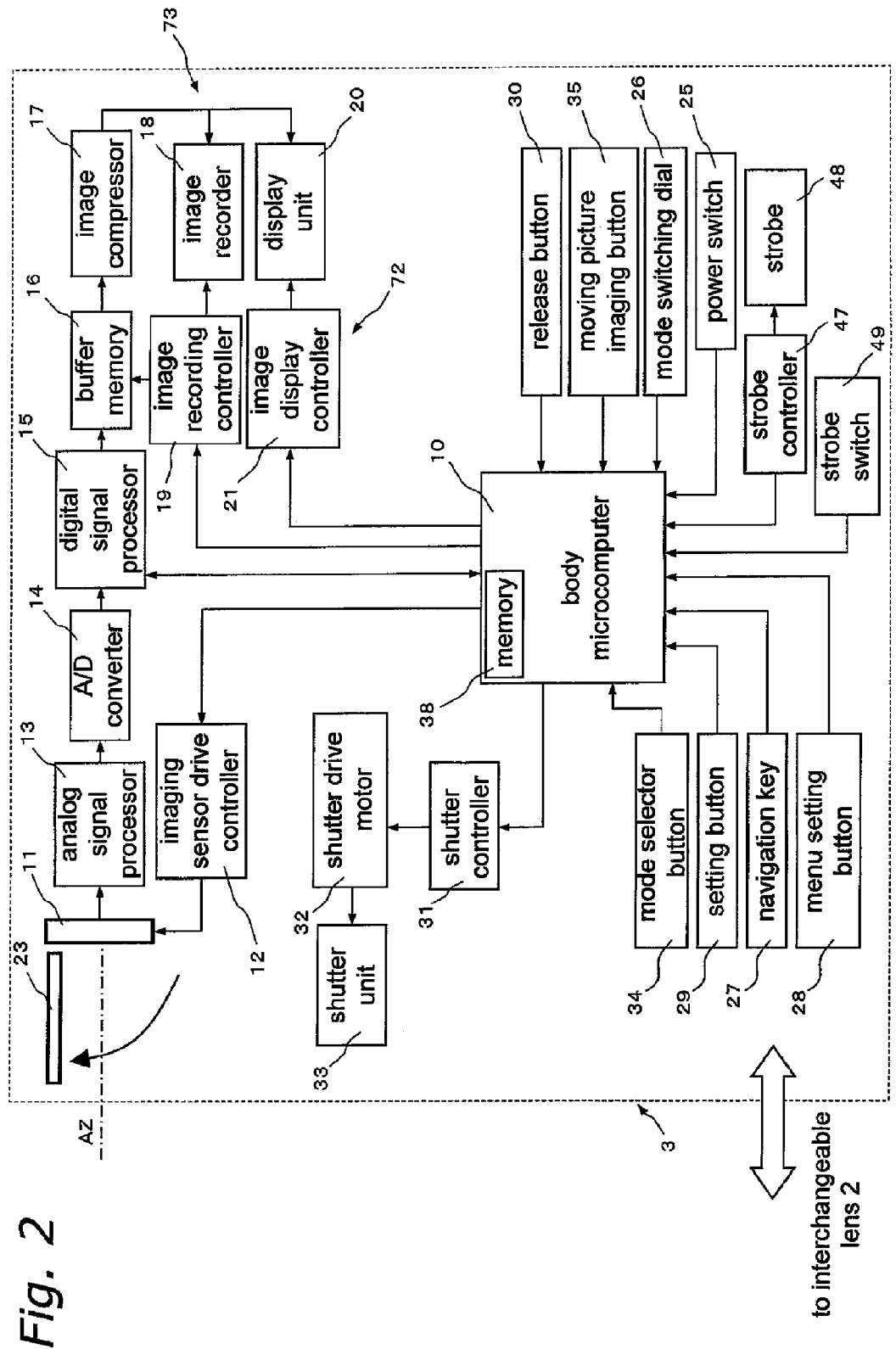
FIG. 2 is a block diagram of the constitution of a camera body.
Figure 3A:
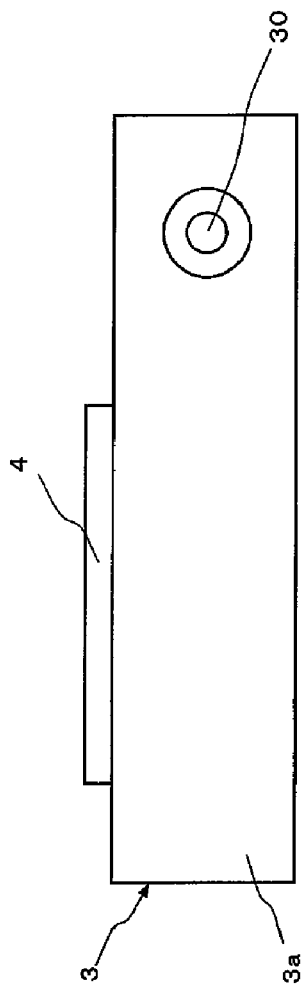
FIG. 3A is a simplified diagram of the camera body constitution.
Figure 3B:
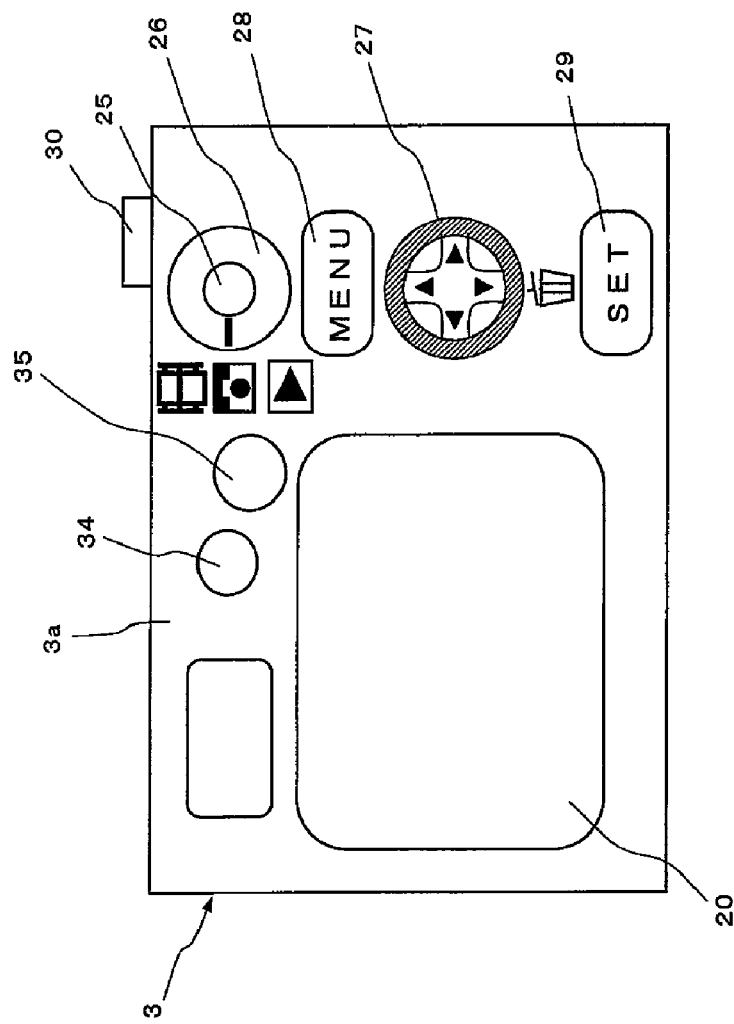
FIG. 3B is a simplified diagram of the constitution of the camera body.

The overall configuration of a camera system 1 according to the first embodiment will be described through reference to FIGS. 1 through 3B. FIG. 1 is a block diagram of the camera system 1. FIG. 2 is a block diagram of a camera body 3. FIGS. 3A and 3B are simplified diagrams of the camera body 3.

As shown in FIG. 1, the camera system 1 is a system used in an interchangeable lens type of single lens reflex digital camera, and mainly comprises a camera main body 3 having the primary function of the camera system 1, and an interchangeable lens 2 that is removably mounted to the camera main body 3. The interchangeable lens 2 is mounted via a lens mount 79 to a body mount 4 provided to the front face of the camera main body 3.

1.1: Camera Body

As shown in FIGS. 1 and 2, the camera body 3 mainly comprises an imaging unit 71 for forming an image of a subject, a body microcomputer 10 serving as a body controller for controlling the operation of the various components such as the imaging unit 71, an image display unit 72 for displaying the captured image and various kinds of information, an image holder 73 for holding image data, and a viewfinder optical system 22 through which the subject image can be seen.

The imaging unit 71 mainly comprises a quick return mirror 23 for guiding incident light to the viewfinder optical system 22 and focus point detection unit 5, an imaging sensor 11 such as a CCD (charge coupled device) for performing opto-electric conversion, a shutter unit 33 for adjusting the exposure state of the imaging sensor 11, a shutter controller 31 for controlling the drive of the shutter unit 33 on the basis of a control signal from the body microcomputer 10, an imaging sensor drive controller 12 for controlling the operation of the imaging sensor 11, and the focus point detection unit 5 for detecting the focus point (the focus state of the subject image). The focus point detection unit 5 performs focus detection by an ordinary phase difference detection method, for example. As to the focus detection method, either phase difference detection, in which the above-mentioned focus point detection unit 5 is used, or contrast detection, which is based on an image signal outputted from the imaging sensor 11, can be used depending on the usage state of the camera system 1. In the case of contrast detection, the focus point for which a contrast value has been found by the body microcomputer 10 is detected. To put this another way, the body microcomputer 10 includes a contrast detector. This focus point detection result is sent to a lens microcomputer 40 (discussed below) and used for the drive of the focus lens group (second lens group L2).

The imaging sensor 11 is, for example, a CCD (charge coupled device) sensor that converts the optical image formed by an imaging optical system L into an electrical signal. The drive of the imaging sensor 11 is controlled on the basis of timing signals generated by the imaging sensor drive controller 12. The imaging sensor 11 may instead be a CMOS (complementary metal oxide semiconductor) sensor.

The body microcomputer 10 is a control device serving as the functional center of the camera body 3, and controls various sequences. More specifically, the body microcomputer 10 is equipped with a CPU, ROM, and RAM, and the body microcomputer 10 can perform many different functions when programs held in the ROM are read into the CPU. For instance, the body microcomputer 10 has the function of detecting that the interchangeable lens unit 2 has been mounted on the camera body 3, the function of acquiring information essential to the control of the camera system 1, such as information about the focal length from the interchangeable lens unit 2, and controlling the operation of the interchangeable lens unit 2, and so on. Furthermore, the body microcomputer 10 has the function of deciding whether or not the interchangeable lens unit 2 is compatible with moving picture imaging (decision part), and the function of setting the operation of the imaging sensor 11 to still picture mode or moving picture mode via the imaging sensor drive controller 12 (mode switching controller). As shown in FIG. 1, the body microcomputer 10 is connected to the various components provided to the camera main body 3.

Also, the body microcomputer 10 can receive signals from the power switch 25, the release button 30, the mode switching dial 26, the cross control key 27, the menu setting button 28, the set button 29, the viewfinder switching button 34, and the moving picture imaging button 35 shown in FIG. 3B. The body microcomputer 10 is an example of the body controller.

Furthermore, as shown in FIG. 2, a memory 38 in the body microcomputer 10 holds various kinds of information related to the camera body 3 (body information). This body information includes, for example, information related to the model, for identifying the camera body 3, such as the name of the manufacturer of the camera body 3, the date of manufacture, the model number, the version of software installed in the body microcomputer 10, and information related to firmware updates (this is called camera identification information). Further, the memory 38 can store information sent from the lens microcomputer 40.

The body microcomputer 10 controls the entire camera system, such as the imaging sensor 11, according to commands from the release button 30 and so forth. The body microcomputer 10 sends a vertical synchronization signal to a timing generator. In parallel with this, the body microcomputer 10 generates an exposure synchronization signal on the basis of the vertical synchronization signal. The body microcomputer 10 repeatedly and periodically sends the generated exposure synchronization signal through the body mount 4 and the lens mount 79 to the lens microcomputer 40.

The body mount 4 can be mechanically and electrically connected to the lens mount 79 of the interchangeable lens unit 2. The body mount 4 is able to exchange data with the interchangeable lens unit 2 via the lens mount 79. For example, the body mount 4 may send an exposure synchronization signal received from the body microcomputer 10 to the lens microcomputer 40 via the lens mount 79. Also, the body mount 4 may send other control signals received from the body microcomputer 10 to the lens microcomputer 40 via the lens mount 79. The body mount 4 may also send the body microcomputer 10 a signal received from the lens microcomputer 40 via the lens mount 79. The power supplied from a power supply unit (not shown) is supplied through the body mount 4 and the lens mount 79 to the entire interchangeable lens unit 2.

As shown in FIGS. 3A and 3B, a case 3*a* of the camera body 3 is held by the user during the imaging of a subject. On the rear face of the case 3*a* are provided a display unit 20, the power switch 25, the mode switching dial 26, the cross control key 27, the menu setting button 28, the set button 29, the viewfinder switching button 34, and the moving picture imaging button 35.

The power switch 25 is used to turn on and off the power to the camera system 1 or the camera body 3. When the power has been turned on with the power switch 25, power is supplied to the various components of the camera body 3 and the interchangeable lens unit 2. The mode switching dial 26 is used to switch between still picture mode, moving picture mode, and reproduction mode, and the user can turn the mode switching dial 26 to switch the mode. When the still picture mode has been selected with the mode switching dial 26, the imaging mode can be switched to the still picture mode, and when the moving picture mode has been selected with the mode switching dial 26, the imaging mode can be switched to the moving picture mode. In moving picture mode, basically moving picture imaging is possible. Further, when reproduction mode has been selected with the mode switching dial 26, the mode can be switched to reproduction mode, and a moving picture image can be displayed on the display unit 20.

The menu setting button 28 is used to set the various operations of the camera system 1. The cross control key 27 is pressed at the top, bottom, left, or right by the user to select the desired menu from various menus screens displayed on the display unit 20. The set button 29 is used to execute the various menu commands. The viewfinder switching button 34 switches between viewfinder imaging mode and monitor imaging mode. The moving picture imaging button 35 is used to start or stop moving picture imaging, and even if the imaging mode set with the mode switching dial 26 is the still picture mode or the reproduction mode, when this moving picture imaging button 35 is pressed, the moving picture mode is forcibly commenced regardless of the setting on the mode switching dial 26. Furthermore, in moving picture mode, pressing the moving picture imaging button 35 ends moving picture imaging and switches to still picture mode or reproduction mode.

As shown in FIG. 3B, the release button 30 is provided to the upper face of the case 3*a*. When the release button 30 is pressed, a timing signal is outputted to the body microcomputer 10. The release button 30 is a two-stage switch that can be pressed halfway down or all the way down, and when the user presses the release button 30 halfway down, light metering and range finding are commenced. Also, when the button is pressed halfway down, power is supplied to the various components, including the body microcomputer 10 and the lens microcomputer 40. When the user then presses the release button 30 all the way down, a timing signal is outputted to the body microcomputer 10. The shutter controller 31 drives a shutter driver motor 32 and operates the shutter unit 33 according to the control signal outputted from the body microcomputer 10 upon receipt of the timing signal.

As shown in FIG. 2, in still picture mode, the body microcomputer 10 that has received a timing signal upon the pressing of the release button 30 outputs a control signal to a strobe controller 47. The strobe controller 47 flashes a strobe 48 made up of an LED or the like on the basis of the control signal. The strobe 48 is controlled according to the amount of light received by the imaging sensor 11. Specifically, the strobe controller 47 automatically flashes in conjunction with the shutter operation when the output of an image signal from the imaging sensor 11 is at or below a specific value. On the other hand, the strobe controller 47 is controlled so that it does not flash the strobe 48 when the output of the image signal is above a specific value.

A strobe switch 49 is used to set the operation of the strobe 48 regardless of the output of the imaging sensor 11. Specifically, the strobe controller 47 flashes the strobe 48 when the strobe switch 49 is "on," and does not flash the strobe 48 when the strobe 48 is "off."

In moving picture mode, when the release button 30 or the moving picture imaging button 35 is pressed, the strobe 48 (made up of an LED or the like) functions as a video light, which shines light toward the subject during moving picture imaging.

The image signal outputted from the imaging sensor 11 (a still or moving picture) is sent for processing from an analog signal processor 13 to an A/D converter 14, a digital signal processor 15, a buffer memory 16, and an image compressor 17, in that order. The analog signal processor 13 performs gamma processing or other such analog signal processing on the image signal outputted from the imaging sensor 11. The A/D converter 14 converts the analog signal outputted from the analog signal processor 13 into a digital signal. The digital signal processor 15 subjects the image signal converted into a digital signal by the A/D converter 14 to digital signal processing, such as noise elimination or contour enhancement. The buffer memory 16 is a RAM, which temporarily stores image signals.

The image signals stored in the buffer memory 16 are sent from the image compressor 17 for processing to an image recorder 18. The image signals stored in the buffer memory 16 are read at a command from an image recording controller 19 and sent to the image compressor 17. The image signal data sent to the image compressor 17 is compressed into an image signal according to a command from the image recording controller 19. This compression reduces the image signal to a smaller data size than that of the original data. The compression method can be, for example, JPEG (Joint Photographic Experts Group) in the case of a still picture. In the case of a moving picture, MPEG (Moving Picture Experts Group) is used. Also, an H.264/AVC format in which a plurality of frames of image signals are compressed together can be used. The compressed image signal is recorded to the image recorder 18 by the image recording controller 19.

The image recorder 18 is an internal memory and/or a removable memory, for example, that records while referencing specific information to be recorded with the image signal on the basis of a command from the image recording controller 19. The specific information to be recorded along with the image signal includes the date and time the image was captured, focal length information, shutter speed information, aperture value information, and imaging mode information. The format for this information includes the Exif (registered trademark) format and formats similar to the Exif (registered trademark) format. The moving picture file may be, for example, an H.264/AVC format or a format similar to an H.264/AVC format.

The display unit 20 is a liquid crystal monitor, for example, and displays as a visible image the image signal recorded to the image recorder 18 or the buffer memory 16 based on a command from an image display controller 21. The display modes of the display unit 20 are a display mode in which just the image signal is displayed as a visible image, and a display mode in which the image signal and information from the time of capture are displayed as a visible image. The display unit 20 may be a variable-angle monitor with which the angle can be freely changed with respect to the case 3*a* of the camera body 3.

As shown in FIG. 1, the quick return mirror 23 is constituted by a main mirror 23*a* capable of reflecting and transmitting incident light, and a sub-mirror 23*b* that is provided on the rear face side of the main mirror 23*a* and reflects light transmitted by the main mirror 23*a*. The quick return mirror 23 can be flipped up out of the optical axis AZ by a quick return mirror controller 36. Incident light is split into two beams by the main mirror 23*a*, and the reflected beam is guided to the viewfinder optical system 22. The transmitted beam is reflected by the sub-mirror 23*b* and utilized as an AF light beam by the focus point detection unit 5. During ordinary imaging, the quick return mirror 23 is flipped up out of the optical axis AZ by the quick return mirror controller 36, the shutter unit 33 is opened, and a subject image is formed on the imaging face of the imaging sensor 11. When imaging is not being performed, as shown in FIG. 1, the quick return mirror 23 is disposed along the optical axis AZ, and the shutter unit 33 is closed.

The viewfinder optical system 22 is constituted by a viewfinder screen 6 on which a subject image is formed, a pentaprism 7 that converts the subject image into an erect image, an eyepiece lens that guides the erect image of the subject to a viewfinder eyepiece window 9, and the viewfinder eyepiece window 9 that is used by the user to view the subject image.

1.2: Interchangeable Lens Unit

As shown in FIG. 1, the interchangeable lens unit 2 mainly comprises an imaging optical system L for forming a subject image on the imaging sensor 11 in the camera system 1, a focus lens group drive controller 41 that performs focusing, an aperture drive controller 42 for adjusting the aperture, and the lens microcomputer 40 for controlling the operation of the interchangeable lens unit 2.

The focus lens group drive controller 41 mainly controls the drive of a second lens group L2 (focus lens group; discussed below) that adjusts the focus. The aperture drive controller 42 mainly controls the drive of an aperture unit 43 for adjusting how open or closed the aperture is.

The lens microcomputer 40 is the main control apparatus for the interchangeable lens unit 2, and is connected to the various components installed in the interchangeable lens unit 2. More specifically, a CPU, ROM, and RAM are installed in the lens microcomputer 40, and the CPU reads the programs loaded in the ROM, which allows the lens microcomputer 40 to carry out its various functions. Also, the body microcomputer 10 and the lens microcomputer 40 are connected by electrical contacts (not shown) provided to the lens mount 79, allowing information to be exchanged between the two.

Various information (lens information) related to the interchangeable lens unit 2 is stored in a memory 44 of the lens microcomputer 40. More specifically, focal length information indicating the maximum and minimum values for focal length of the interchangeable lens unit 2 (focal length variable range), or the object point distance, etc., is stored. The various information stored in the memory 44 is sent to the camera body 3 side when the interchangeable lens unit 2 is attached to the camera body 3 so that it can be used during imaging. Information related to whether or not the interchangeable lens unit 2 is compatible with the above-mentioned moving picture imaging is also stored in the memory 44. The information related to moving picture imaging will be discussed in detail below.

Figure 4:
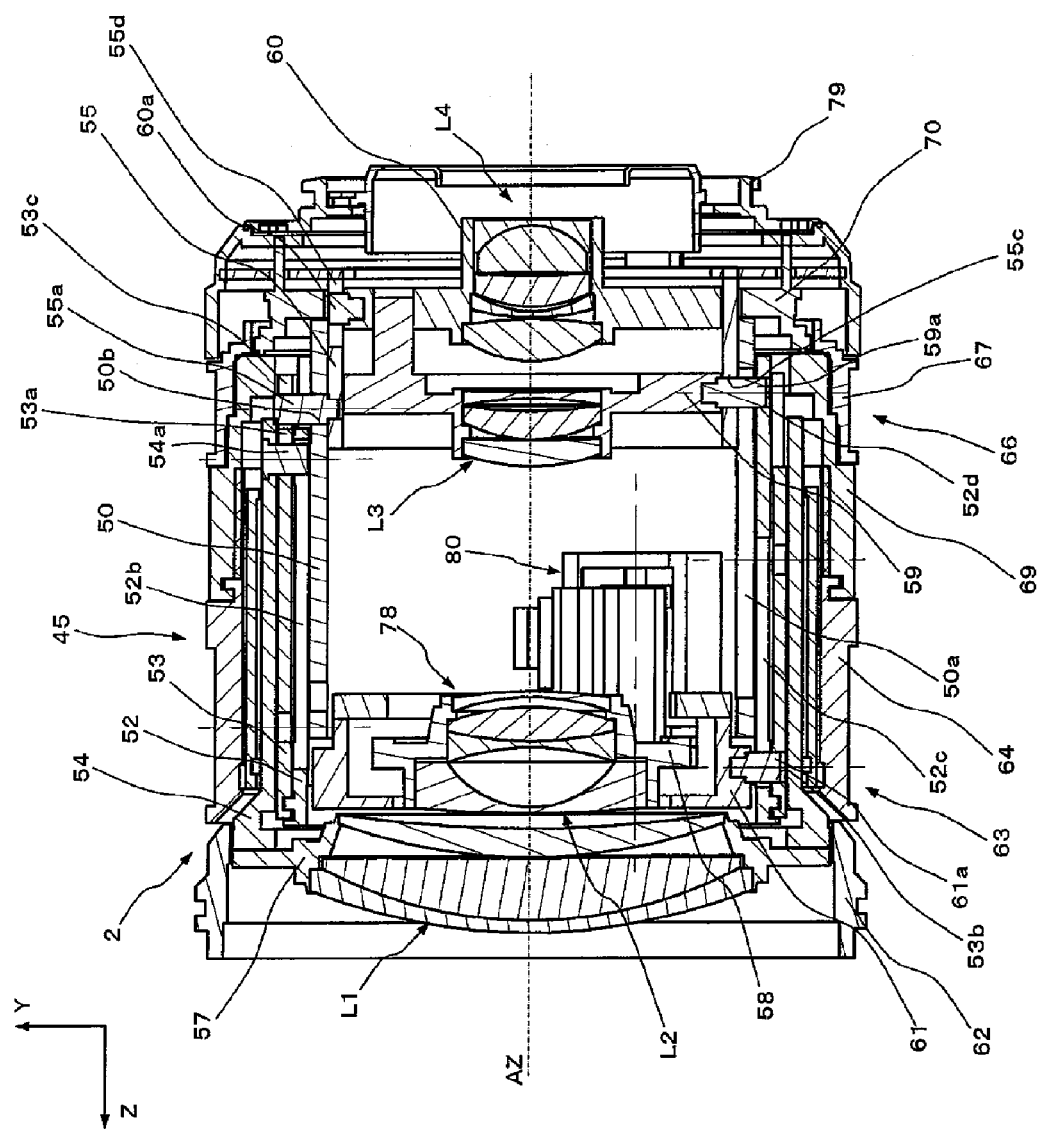
FIG. 4 is a cross section at the wide angle end of an interchangeable lens unit.

The specific configuration of the interchangeable lens unit 2 will be described through reference to FIGS. 4 to 7. As shown in FIG. 4, an XYZ three-dimensional coordinate system is set up in which the direction along the optical axis AZ of the interchangeable lens unit 2 serves as the Z axis direction (the subject side is the positive side, and the camera body 3 side is the negative side). The imaging optical system L, which has four lens groups, is installed in the interchangeable lens unit 2. More specifically, the interchangeable lens unit 2 has a first lens group L1, a second lens group L2, a third lens group L3, and a fourth lens group L4. The first lens group L1, second lens group L2, third lens group L3, and fourth lens group L4 are able to move along the optical axis AZ in the Z axis direction. The second lens group L2 is the lens group that moves along the optical axis AZ in the Z axis direction to perform focusing.

The interchangeable lens unit 2 has a lens barrel 45 that supports the imaging optical system L. The lens barrel 45 has a fixed frame 50, a first linear frame 52, a first rotary frame 53, a first holder 54, a second rotary frame 55, a first lens support frame 57, a second lens support frame 58, a third lens support frame 59, a fourth lens support frame 60, a second holder 61, a filter mount 62, a zoom ring unit 63, a focus ring unit 66, and a lens mount 79.

The first rotary frame 53 is disposed coaxially on the outer peripheral side of the first linear frame 52, and is supported by the first linear frame 52 so as to be capable of relative rotation around the optical axis AZ.

The first holder 54 is disposed coaxially on the outer peripheral side of the first rotary frame 53, and its relative rotation around the optical axis AZ is limited by the first linear frame 52. When the first rotary frame 53 rotates around the optical axis AZ, the first holder 54 moves in the Z axis direction without rotating with respect to the first linear frame 52 (while rotating with respect to the first rotary frame 53). Three cam pins 54a disposed at a constant pitch in the circumferential direction are provided to the portion of the first holder 54 on the negative side in the Z axis direction.

The second holder 61 is disposed coaxially on the inner peripheral side of the first linear frame 52, and its relative rotation around the optical axis AZ is limited by the first linear frame 52. The second holder 61 has three cam pins 61a disposed at a constant pitch in the circumferential direction. The cam pins 61a are inserted into linear through-grooves 52c of the first linear frame 52 and cam though-grooves 53b of the first rotary frame 53. Therefore, when the first rotary frame 53 rotates around the optical axis AZ, the second holder 61 moves in the Z axis direction without rotating with respect to the first linear frame 52 (while rotating with respect to the first rotary frame 53).

The first linear frame 52 is disposed coaxially on the outer peripheral side of the fixed frame 50, and is supported by the fixed frame 50, the second rotary frame 55, and the third lens support frame 59. The relative rotation of the first linear frame 52 around the optical axis AZ is limited by the fixed frame 50. When the first rotary frame 53 rotates around the optical axis AZ, the first linear frame 52 moves in the Z axis direction without rotating with respect to the fixed frame 50.

The second rotary frame 55 is disposed coaxially on the inner peripheral side of the fixed frame 50, and is supported by the fixed frame 50. When the first rotary frame 53 rotates around the optical axis AZ, the second rotary frame 55 moves along the optical axis AZ while rotating around the optical axis AZ with respect to the fixed frame 50.

The third lens support frame 59 is disposed coaxially on the inner peripheral side of the second rotary frame 55, and its relative rotation around the optical axis AZ is limited by the fixed frame 50. When the first rotary frame 53 rotates around the optical axis AZ, the third lens support frame 59 moves in the Z axis direction without rotating with respect to the fixed frame 50.

The fourth lens support frame 60 is disposed coaxially on the inner peripheral side of the second rotary frame 55, and its relative rotation around the optical axis AZ is limited by the third lens support frame 59. When the first rotary frame 53 rotates around the optical axis AZ, the fourth lens support frame 60 moves along the optical axis AZ without rotating with respect to the third lens support frame 59.

The first lens support frame 57 is fixed to the end of the first holder 54, and supports the first lens group L1. The second lens support frame 58 supports the second lens group L2. An ultrasonic actuator unit 80 (discussed below) and an anti-rotation unit (not shown) disposed at a substantially opposite position on the circumference thereof are provided to the second lens support frame 58.

The third lens support frame 59 supports the third lens group L3 and has three cam pins 59a disposed at a constant pitch in the circumferential direction.

The fourth lens support frame 60 supports the fourth lens group L4 and has three cam pins 60a disposed at a constant pitch in the circumferential direction.

The first rotary frame 53 is a cam ring that is cylindrical in shape, and has three cam though-grooves 53a and 53b that are inclined with respect to the optical axis AZ. The cam pins 54a of the first holder 54 are inserted into the cam though-grooves 53a. The cam pins 61a of the second holder 61 are inserted into the cam though-grooves 53b. Three slots 53c into which the cam pins 55a of the second rotary frame 55 are inserted are provided to the end of the first rotary frame 53. The cam pins 55a include one long pin and two short pins, and only the long pin is inserted into the slots 53c.

The first linear frame 52 is a cam ring that is cylindrical in shape, and has three cam though-grooves 52b into which the cam pins 54a of the first holder 54 are inserted. Three linear through-grooves 52c into which the cam pins 61a of the second holder 61 are inserted are formed at positions where they will not interfere with the cam though-grooves 52b. Through-holes 52d into which the cam pins 59a provided to the third lens support frame 59 are inserted are provided to the end of the first linear frame 52 to allow integral movement with the third lens support frame 59 in the Z axis direction.

Three linear through-grooves 50a for moving the first linear frame 52 in the Z axis direction are formed in the fixed frame 50. Three cam though-grooves 50b that are inclined with respect to the Z axis direction are formed at a constant pitch in the circumferential direction, at a portion where there is no interference with the linear through-grooves 50a, in order to move the second rotary frame 55 in a direction along the optical axis AZ.

Three cam through-grooves 55c that are inclined with respect to the Z axis direction and engage with the cam pins 59a of the third lens support frame 59 are formed at a constant pitch in the circumferential direction on the outer peripheral face of the second rotary frame 55. Three cam through-grooves 55d that are tilted with respect to the Z axis direction and engage with the cam pins 60a of the fourth lens support frame 60 are formed at a constant pitch in the circumferential direction.

The filter mount 62 is cylindrical in shape, and a polarizing filter, protective filter, or other such optical filter and female threads for attaching a conversion lens are formed on the Z axis direction positive side (subject side). The filter mount 62 is fixed to the first holder 54 by three attachment screws, etc.

The zoom ring unit 63 has a zoom ring 64 and a first angle detector 65 (FIG. 1) that detects the rotational angle of the zoom ring 64. The zoom ring 64 is cylindrical in shape, and is supported rotatably around the optical axis AZ, while restricted in the direction along the optical axis AZ with respect to a ring base 69 fixed to the fixed frame 50. A concave portion (not shown) that is restricted only around the optical axis AZ and is not restricted in the direction along the optical axis AZ is formed on the inner peripheral part of the zoom ring 64. This concave portion engages with a convex portion (not shown) provided to the outer peripheral part of the first rotary frame 53. Thus, the zoom ring 64 rotates integrally with the first rotary frame 53. Also, the first angle detector 65 detects the rotational angle and rotation direction of the zoom ring 64, and transmits focal length information to the lens microcomputer 40. The focal length of the imaging optical system L is displayed on the outer peripheral face of the zoom ring 64. The absolute positions of the lens groups L1 to L4 can be detected by a detecting sensor (not shown) that is linked to the rotational angle of the zoom ring 64.

The focus ring unit 66 has a focus ring 67 and a second angle detector 68 (FIG. 1) that detects the rotational angle of the focus ring 67. The focus ring 67 is cylindrical in shape, and is supported rotatably around the optical axis AZ, while restricted in the direction along the optical axis AZ with respect to a ring base 69 fixed to the fixed frame 50. Also, the rotational angle and rotation direction of the focus ring 67 can be detected by the second angle detector 68. This second angle detector 68 detects, for example, whether or not protrusions formed at regular intervals in the Z axis direction all the way around the focus ring 67 have passed between the light emitting part and the light receiving part that are the constituent portions of two photosensors (not shown), and thereby detects the rotational angle and rotation direction of the focus ring 67. The second angle detector 68 detects the rotational angle and rotation direction of the focus ring 67 set by the user, and transmits object point distance information to the lens microcomputer 40.

The lens mount 79 has a lens mount contact (not shown), and signals are transmitted back and forth between the lens microcomputer 40 and the body microcomputer 10 via a lens mount contact (not shown) of the body mount 4. Also, the lens mount 79 is fixed via the fixed frame 50 and the drive unit 70.

Figure 6:
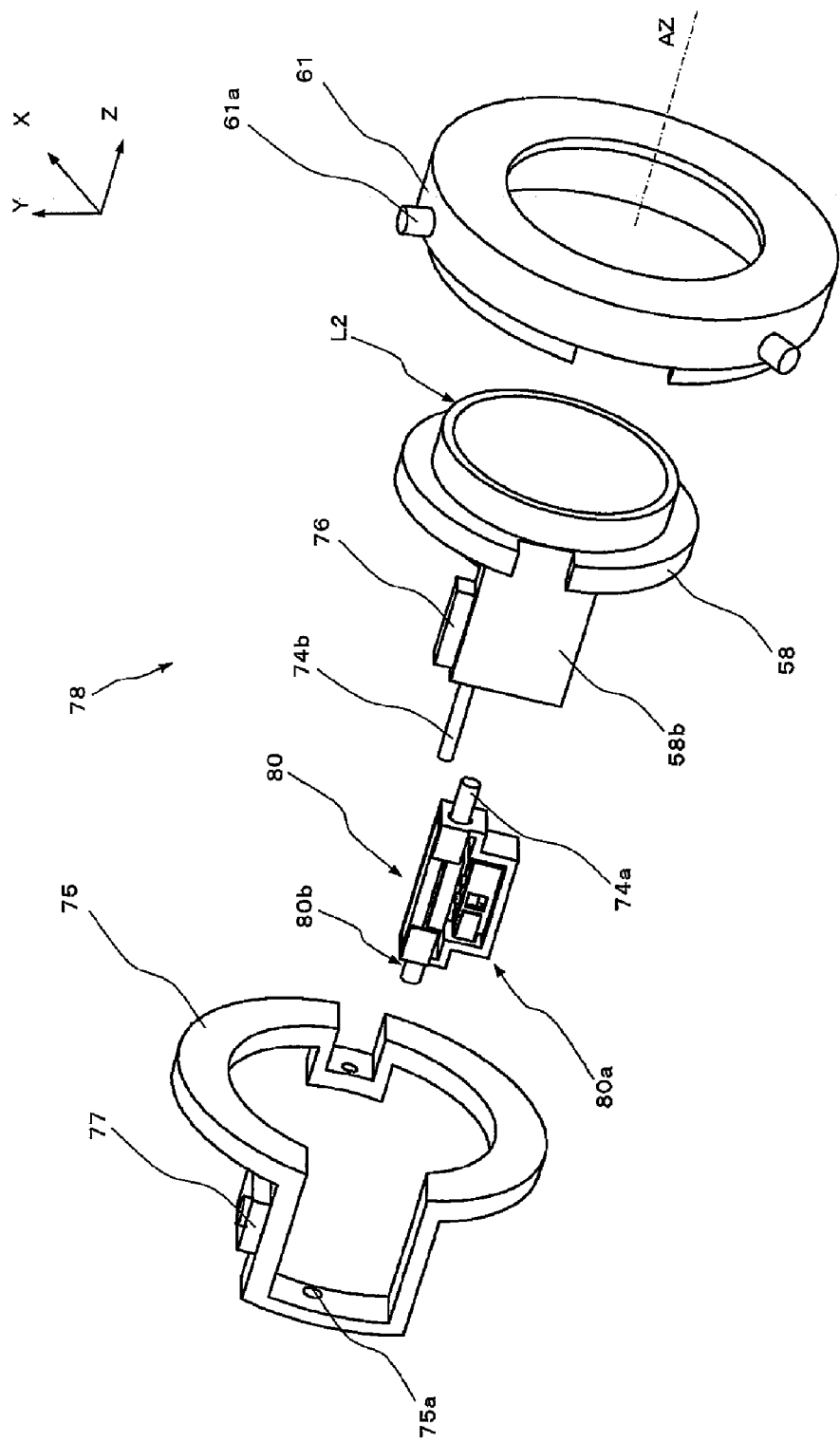
FIG. 6 is an exploded oblique view of the constitution of a focus lens unit.
Figure 7:
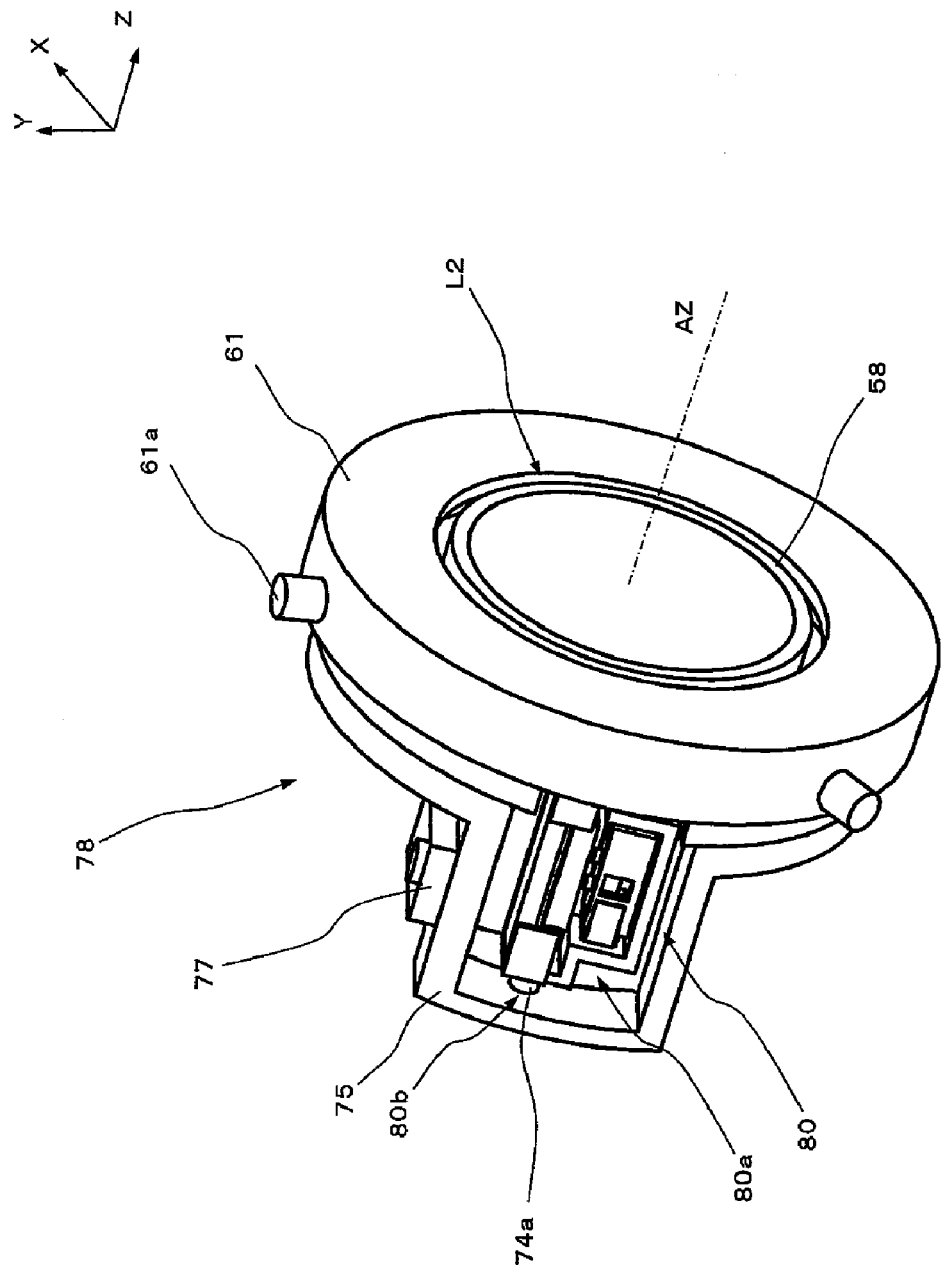
FIG. 7 is an assembled oblique view of the constitution of a focus lens unit.

As shown in FIGS. 6 and 7, a focus lens unit 78 that can move in a direction along the optical axis AZ as the focussing proceeds has the second lens group L2, the second lens support frame 58, the second holder 61, guide poles 74a and 74b, a two-group fixing frame 75, the ultrasonic actuator unit 80, a magnetic scale 76, and a magnetic sensor 77. The second lens support frame 58 supports the second lens group L2 (focus lens group). The ends of the guide pole 74a are included in the ultrasonic actuator unit 80 and fixed to the two-group fixing frame 75 and the second holder 61. The guide pole 74b extends in the Z axis direction from a fixing portion 58b of the second lens support frame 58, and is inserted into a hole 75a in the two-group fixing frame 75. The second lens support frame 58 is supported movably in the Z axis direction by the two-group fixing frame 75. The second lens support frame 58 is driven in the Z axis direction by the ultrasonic actuator unit 80.

The ultrasonic actuator unit 80 has a movable part 80a and a fixed part 80b. The movable part 80a is fixed with screws or the like to the fixing portion 58b of the second lens support frame 58. When a specific current is sent to the ultrasonic actuator unit 80, the movable part 80a moves in the Z axis direction with respect to the fixed part 80b, and the second lens support frame 58 is driven in the Z axis direction as a result.

The magnetic scale 76 and magnetic sensor 77 constitute a position detecting unit that detects the position of the second lens support frame 58 with respect to the two-group fixing frame 75. The magnetic scale 76 is fixed to the second lens support frame 58 and is magnetized at regular intervals in the Z axis direction. The magnetic sensor 77 is an MR sensor or the like that detects signals from the magnetic scale 76, and is fixed to the two-group fixing frame 75. A specific spacing is maintained between the magnetic sensor 77 and the magnetic scale 76. Performing position detection and feedback control with the magnetic sensor 77 affords a linear actuator that has high-speed response as well as high resolution, high accuracy, quiet operation, and high torque. Consequently, focus characteristics that are ideal for moving picture imaging can be obtained. Furthermore, the home position of the second lens group L2, that is, the second lens support frame 58, can be detected with a photosensor or the like (not shown). Detecting the home position makes it possible to detect the absolute position of the second lens group L2 with respect to the lens mount 79. Also, as to the relative position from the home position, where the second lens group L2 is located can always be detected by counting the output value from the magnetic sensor 77. In other words, it is always possible to detect the current position of the second lens group L2, using the lens mount 79 as a reference, by detecting the relative position away from the home position.

Figure 8:
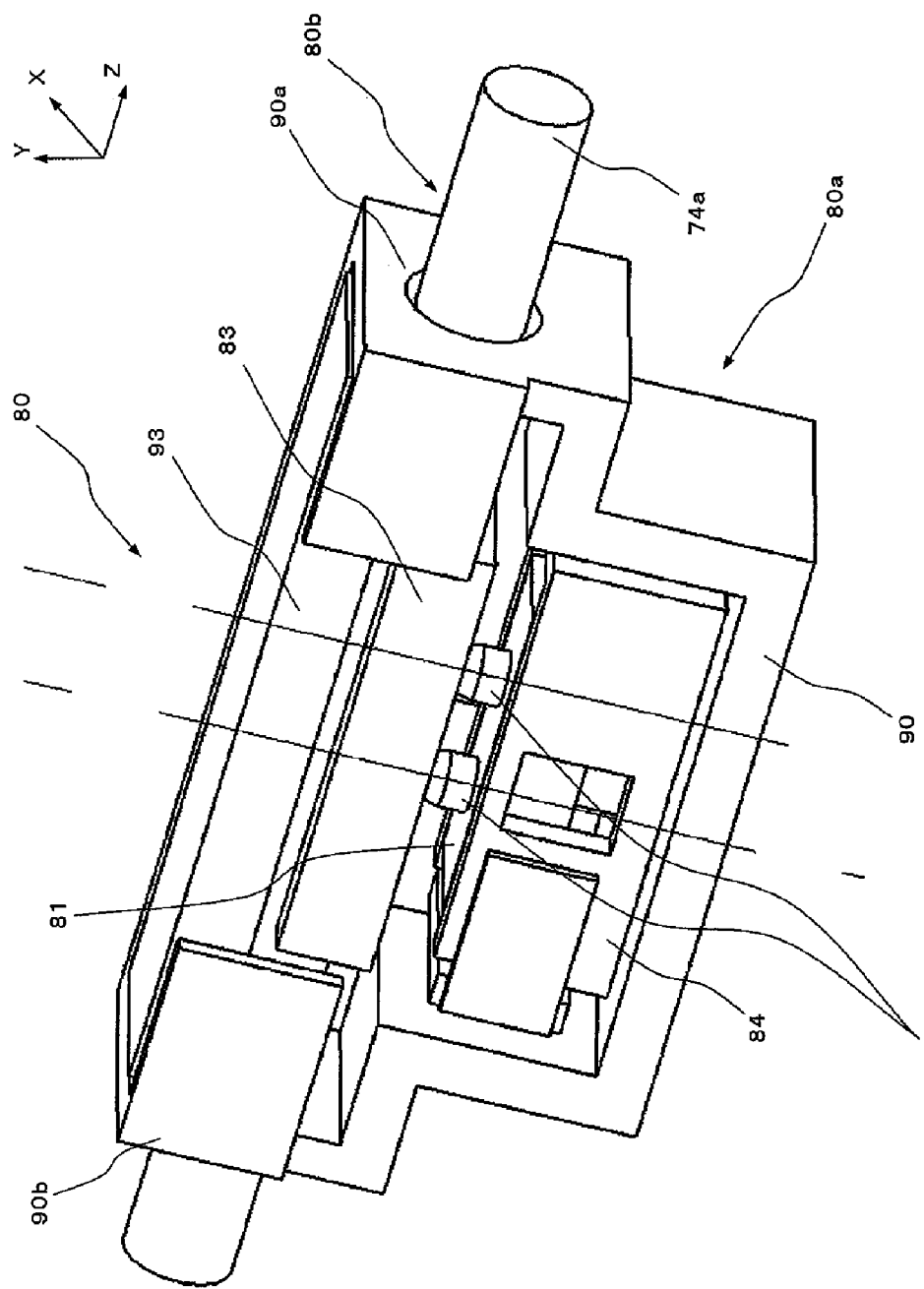
FIG. 8 is an oblique view of an ultrasonic actuator unit.
Figure 9:
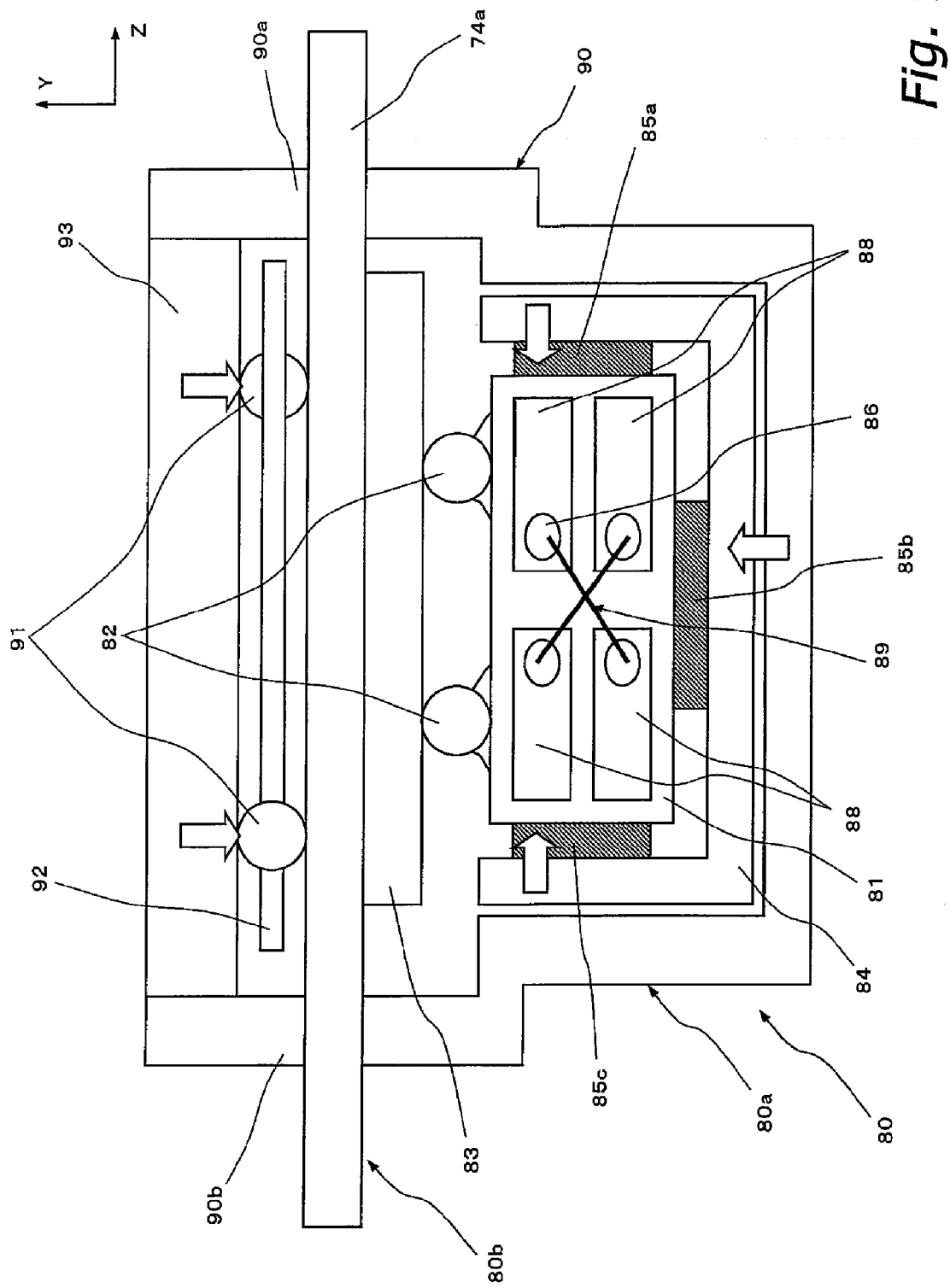
FIG. 9 is a simplified diagram of an ultrasonic actuator unit.

Next, the ultrasonic actuator unit 80 will be described through reference to FIGS. 8 and 9. FIG. 8 is an oblique view of the ultrasonic actuator unit. FIG. 9 is a cross section of the ultrasonic actuator unit.

As shown in FIGS. 8 and 9, in the ultrasonic actuator unit 80, substantially spherical drivers 82 are provided at two places on the surface of a piezoelectric element 81 composed of PZT, quartz crystal, or another such piezoelectric material. These two places correspond to the approximate center of the antinode of flexural vibration of the piezoelectric element 81, and the vibration of the piezoelectric element 81 can be more effectively utilized by providing the drivers 82 at these locations.

Examples of the material of the drivers 82 include zirconia, alumina, silicon nitride, silicon carbide, and tungsten carbide. The shape of the drivers 82 is substantially spherical, and using a substantially spherical shape reduces the contact surface area of the piezoelectric element 81 in the lengthwise direction. Consequently, the flexural vibration of the piezoelectric element 81 tends not to be hindered, and as a result its efficiency as an ultrasonic actuator can be improved.

A power supply electrode 88 that is divided in four is provided to the front face of the piezoelectric element 81, and these power supply electrodes 88 are connected to wires 89 by solder 86. The wires 89 are guided to the outside through holes (not shown) provided to an inner case 84. When voltage is supplied through these wires 89 to the power supply electrodes 88 of the piezoelectric element 81, the piezoelectric element 81 vibrates according to the frequency of the voltage. The portion of the piezoelectric element 81 where the solder 86 is formed is the node periphery of stretching vibration and flexural vibration. If this node is used as the site where the wires 89 are connected, this will reduce the adverse effect on the vibration of the piezoelectric element 81, that is, the unnecessary load on the piezoelectric element 81 caused by forming the solder 86.

The ultrasonic actuator unit 80 mainly has the movable part 80*a* and the fixed part 80*b*. The movable part 80*a* has the piezoelectric element 81, the drivers 82, the inner case 84, an outer case 90, guide poles 91, a retainer 92, and an outer case cover 93. The fixed part 80*b* has a moving body 83, a diaphragm 94, and the guide pole 74*a*.

The drivers 82 support the moving body 83, and the drivers 82 undergo substantially elliptical motion under the vibration of the piezoelectric element 81, which causes the drivers 82 to move reciprocally in the Z axis direction with respect to the moving body 83. Specifically, the stretching vibration direction of the piezoelectric element 81 is the same as the direction in which the moving body 83 is able to move. Also, the flexural vibration direction is perpendicular to the movable direction with respect to the moving body 83, and is a direction that links the piezoelectric element 81 and the moving body 83 (that is, the direction in which the drivers 82 support the moving body 83).

Alumina is an example of the material of the moving body 83. If alumina is used for the drivers 82, then from the standpoint of wear, the alumina of the moving body 83 is preferably softer than the alumina of the drivers 82.

The piezoelectric element 81 is housed in the inner case 84, and the piezoelectric element 81 is supported by a support 85 provided inside the inner case 84. The support 85 is made from electroconductive silicone rubber, for example. Specifically, the piezoelectric element 81 is disposed in the inner case 84 so that the stretching direction of the piezoelectric element 81 is the same as the direction in which the moving body 83 is able to move (the Z axis direction, a direction along the optical axis AZ). Side wall supports 85*a* and 85*c* are provided to the inner wall faces of the inner case 84 in the same direction as the direction in which the moving body 83 is able to move, and lateral pressure is exerted on the inner wall faces. A rear face support 85*b* is provided to the inner bottom face of the inner case 84, which supports the piezoelectric element 81 and thereby exerts a pressing force. The rear face support 85*b* is provided so that the two drivers 82 here support the moving body 83 at substantially the same pressure, and this allows the moving body 83 to be operated stably.

The inner case 84 is fixed inside the outer case 90. The guide pole 74*a*, which is cylindrical in shape, is disposed at the upper part of the moving body 83. Two guide poles 91 supported by the retainer 92 are provided on the upper side of the guide pole 74*a*. The outer case cover 93 is provided at the upper part of the guide poles 91. The guide poles 91 are sandwiched between the outer case cover 93 and the guide pole 74*a*. Accordingly, a pressing force is exerted on the guide pole 74*a* via the guide poles 91. Consequently, the guide pole 74*a* and the moving body 83 are pressed together and fixed at a specific pressure.

Bearings 90*a* and 90*b* that support the guide pole 74*a* are provided to the ends on both sides of the outer case 90, and the outer case 90 is able to move in the Z axis direction with respect to the guide pole 74*a*. That is, when the drivers 82 move elliptically, this allows the movable part 80*a* to move reciprocally in a direction along the optical axis AZ with respect to the fixed part 80*b* comprising the guide pole 74*a* and the moving body 83.

The operation of the ultrasonic actuator unit 80 constituted as above will now be described. When AC voltage of a specific frequency is applied to a specific power electrode of the piezoelectric element 81, a secondary mode of flexural vibration and a primary mode of stretching vibration are induced in the piezoelectric element 81. The resonance frequency of the flexural vibration and the resonance frequency of the stretching vibration are determined by the material, shape, and so forth of the piezoelectric element, and if these two frequencies are substantially matched, and voltage with a frequency that is close to these is applied, a flexural secondary mode and a stretching primary mode will be harmonically induced in the piezoelectric element 81. As a result, the drivers 82 provided to the piezoelectric element 81 undergo elliptical motion as viewed in the direction of the drawing plane. Specifically, the combination of the flexural vibration and stretching vibration of the piezoelectric element 81 brings about elliptical motion in the drivers 82. Because of this elliptical motion, the movable part 80*a* constituted by the drivers 82, etc., can move reciprocally in the Z axis direction with respect to the moving body 83, and moves integrally with the second lens group L2.

Slidably supporting the focus lens group with the two guide poles in this way differs from drive by a conventional rotary cam mechanism in that there is no backlash or hysteresis, and wobbling (minute reciprocal vibrations) is possible in a direction along the optical axis AZ, so the focus lens group drive can be controlled so that a focused state is always maintained, by contrast detection using the imaging sensor 11. This means that moving picture imaging is possible even with a digital single lens reflex camera.

1.3: Information Related to Interchangeable Lens Unit

Information related to the interchangeable lens unit 2 will now be described. Various kinds of information related to the interchangeable lens unit 2 (lens information) is stored in the memory 44 of the lens microcomputer 40. More specifically, focal length information indicating the maximum and minimum values for focal length of the interchangeable lens unit 2 (focal length variable range), or the object point distance, etc., is stored in the memory 44.

The memory 44 also holds information related to whether or not the interchangeable lens unit 2 is compatible with the above-mentioned moving picture imaging. This information is recorded to a specific address in the memory 44 (such as an extra address that is not normally used).

One possible criterion for determining whether or not the interchangeable lens unit 2 is compatible with moving picture imaging is whether or not the second lens group L2 serving as a focus lens group is capable of wobbling (such as minute reciprocal vibration based on a triangular wave, a sine wave, or another such input signal). If the constitution is such that the second lens group L2 is supported by guide poles and the second lens group L2 is driven directly by an ultrasonic actuator or the like, it can be determined that wobbling is possible. Therefore, information related to how the second lens group L2 is driven may be used as information related to whether or not the interchangeable lens unit 2 is compatible with moving picture imaging.

Furthermore, a constitution in which the amount of magnification change in the image on the imaging sensor 11 is at or below a specific value when the second lens group L2 is wobbled by a specific amount can be the criterion for determining whether or not there is compatibility with moving picture imaging. Accordingly, information such as this may be used as information related to whether or not the interchangeable lens unit 2 is compatible with moving picture imaging.

Compatibility with moving picture imaging means that the interchangeable lens unit 2 is compatible with contrast detection. Therefore, information as to whether or not there is compatibility with a contrast detection method may be used as information related to whether or not the interchangeable lens unit 2 is compatible with moving picture imaging.

If these types of information are stored in the interchangeable lens unit 2, then when this interchangeable lens unit 2 is attached to the camera body 3, it is determined by the body microcomputer 10 on the camera body 3 side whether or not moving picture imaging is possible. Also, the optimal focusing performance can be set by storing focusing speed, minimum resolution, and so forth individually and combining with the camera body 3, depending on the performance of the ultrasonic actuator or other such focusing lens group drive actuator. For instance, the frame rate during moving picture imaging (30 fps, 60 fps, etc.), the recording pixel count, and so forth can be automatically set for the camera system 1 according to this focusing performance. Thus, in combining with an interchangeable lens unit 2 equipped with an ultrasonic actuator, it is even better if the frame rate during moving picture imaging can be automatically set to the highest frame rate that the camera body 3 can attain (60 fps in the case of this embodiment).

When the interchangeable lens unit 2 is attached to the camera body 3, this information is sent from the lens microcomputer 40 to the body microcomputer 10. This allows the body microcomputer 10 to acquire various information about the interchangeable lens unit 2.

2: Operation of Camera System

The imaging operation of the camera system 1 constituted as above will now be described.

Figure 10:
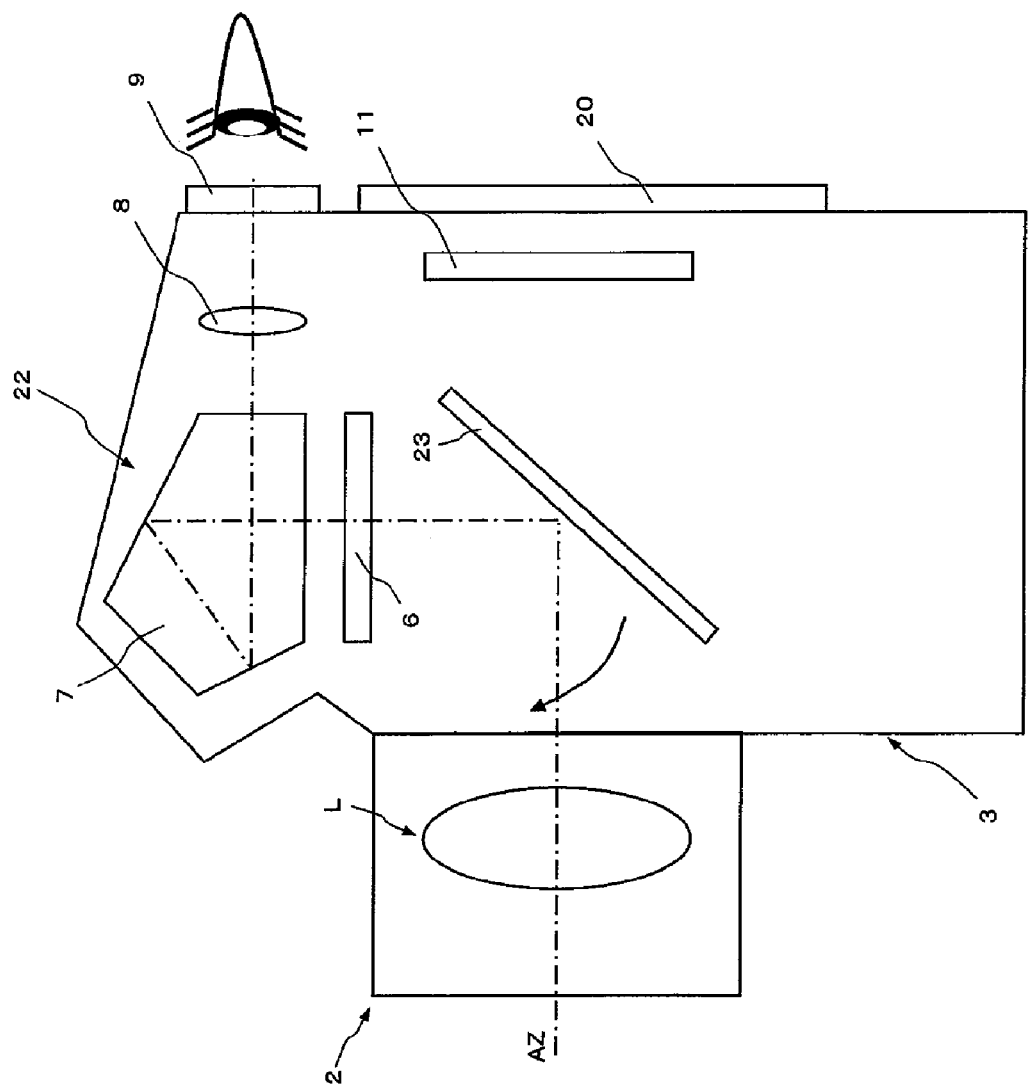
FIG. 10 is a diagram illustrating viewfinder mode.
Figure 11:
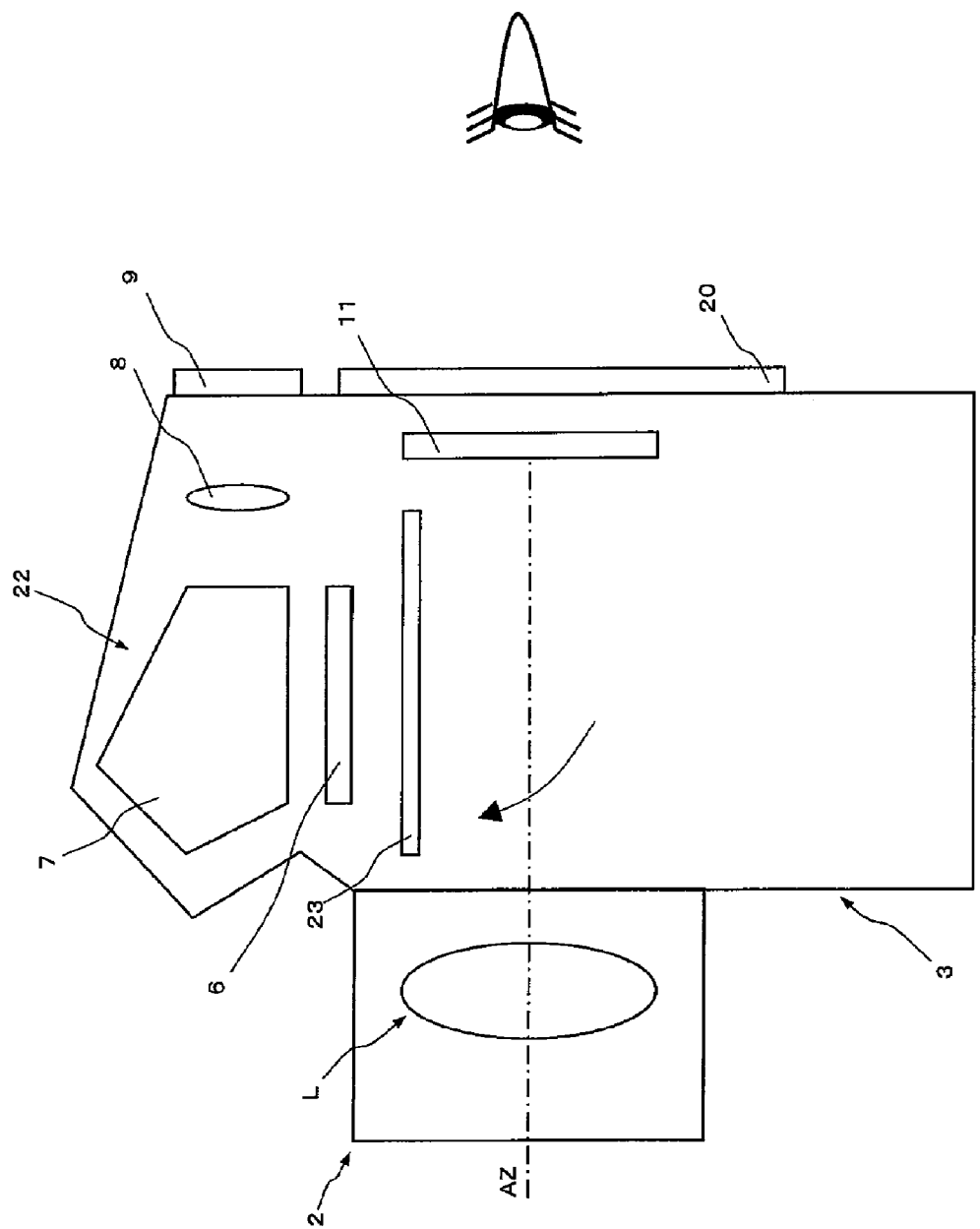
FIG. 11 is a diagram illustrating monitor imaging mode.

FIGS. 10 and 11 are concept diagrams of during imaging with the camera system 1. FIG. 10 is a diagram illustrating a viewfinder imaging mode, and FIG. 11 is a diagram illustrating a monitor imaging mode.

2.1: State Prior to Imaging

As shown in FIGS. 10 and 11, light from the subject (not shown) passes through the interchangeable lens unit 2 and is incident on the main mirror 23a, which is a semi-transmitting mirror. Part of the light incident on the main mirror 23a is reflected and incident on the viewfinder screen 6, and the rest of the light is transmitted and incident on the sub-mirror 23b. Light incident on the viewfinder screen 6 forms a subject image. This subject image is converted into an erect image by the pentaprism 7 and incident on an eyepiece lens 8. This allows the user to view an erect image of the subject through the viewfinder eyepiece window 9. Light that is incident on the sub-mirror 23b is reflected and incident on the focus point detection unit 5.

2.2: Viewfinder Imaging Mode and Monitor Imaging Mode

This camera system 1 has two imaging modes, namely, a viewfinder imaging mode and a monitor imaging mode. The viewfinder imaging mode is a mode in which the user captures a still picture while looking at the subject through the viewfinder eyepiece window 9. This is the normal imaging mode in a conventional single lens reflex camera. The monitor imaging mode is a mode in which the user captures a still or moving picture while looking at the subject displayed on the display unit 20, which is a liquid crystal monitor or the like.

In the viewfinder imaging mode, as shown in FIG. 10, the quick return mirror 23 is disposed at a specific location along the optical path, and the subject light is guided to the viewfinder optical system 22, so the user can view the subject image through the viewfinder eyepiece window 9. During actual imaging, the quick return mirror 23 is flipped up outside of the optical axis AZ, and the shutter unit 33 is opened, which forms a subject image on the image face of the imaging sensor 11.

Meanwhile, in the monitor imaging mode, as shown in FIG. 11, the quick return mirror 23 is retracted out of the optical axis AZ. Thus, an image of the subject, what is called a through image, is displayed on the display unit 20 via the imaging sensor 11.

2.3: Operation in Viewfinder Imaging Mode

The imaging operation of the camera system 1 will be described. The drive sequence in viewfinder imaging mode in which the user looks through the viewfinder eyepiece window 9 to capture an image will be described through reference to FIGS. 1 to 4.

When an image is to be captured in viewfinder imaging mode, the user presses the viewfinder switching button 34 provided to the rear face of the case 3a to select the viewfinder imaging mode as the imaging mode.

When the user presses the release button 30 halfway down, power is supplied to the body microcomputer 10 and the various units in the camera system 1. The body microcomputer 10 in the camera system 1 that has been actuated by the supply of power receives various lens information from the lens microcomputer 40 in the interchangeable lens unit 2, which is similarly actuated by the supply of power, through the lens mount 79 and the body mount 4, and this information is stored in the built-in memory 38. Next, the body microcomputer 10 acquires the amount of defocus (hereinafter referred to as the Df amount) from the focus point detection unit 5, and sends a command to the lens microcomputer 40 to drive the focus lens group 24 by this Df amount. The lens microcomputer 40 controls the focus lens group drive controller 41 and operates the second lens group L2 by the Df amount. As focus point detection and drive of the second lens group L2 are thus repeated, the Df amount decreases, and when it reaches a specific amount or less, the body microcomputer 10 decides that the image is in focus, and drive of the second lens group L2 is stopped.

After this, when the user presses the body microcomputer 10 all the way down, the body microcomputer 10 instructs the lens microcomputer 40 to set the aperture value to the one calculated on the basis of the output from a photometer sensor (not shown). The lens microcomputer 40 then controls the aperture drive controller 42 and stops down the aperture to the indicated aperture value. Simultaneously with this aperture value command, the body microcomputer 10 retracts the quick return mirror 23 from within the optical axis AZ with the quick return mirror controller 36. Once the quick return mirror 23 has been completely retracted, the imaging sensor drive controller 12 directs the image sensor 11 to be driven, and directs the shutter unit 33 to be operated. The imaging sensor drive controller 12 also exposes the image sensor 11 for the time of the shutter speed calculated on the basis of the output from a photometer sensor (not shown).

Upon completion of the exposure, the image data read by the imaging sensor drive controller 12 from the image sensor 11 is subjected to specific image processing, after which it is displayed as a captured image on the display unit 20. The image data that has been read from the image sensor 11 and subjected to the specific image processing is written via the image recorder 18 as image data to a storage medium. Also, upon the completion of exposure, the quick return mirror 23 and the shutter unit 33 are reset to their initial positions. The body microcomputer 10 directs the lens microcomputer 40 to reset the aperture to its open position, and the lens microcomputer 40 issues a reset command to the various units. Upon completion of the resetting, the lens microcomputer 40 notifies the body microcomputer 10 of the resetting completion. The body microcomputer 10 awaits the completion of the series of processing after exposure and the resetting completion information from the lens microcomputer 40, after which it is confirmed that the release button 30 has not been pressed, and the imaging sequence is ended.

2.4: Operation in Monitor Imaging Mode

The drive sequence in monitor imaging mode, which the user uses the display unit 20 to capture an image, will now be described through reference to FIGS. 1 to 3B and FIG. 5.

When the display unit 20 is used for imaging, the user presses the viewfinder switching button 34 to select the monitor imaging mode. When the monitor imaging mode is set, the body microcomputer 10 retracts the quick return mirror 23 from within the optical axis AZ. Consequently, light from the subject reaches the imaging sensor 11. The imaging sensor 11 converts light from the subject that has formed an image on the imaging sensor 11 into image data, and the image data thus acquired can be outputted. The image data read from the imaging sensor 11 by the imaging sensor drive controller 12 undergoes specific image processing, after which it is displayed as a captured image on the display unit 20. Thus displaying the captured image on the display unit 20 allows the user to follow the subject without having to look through the viewfinder eyepiece window 9.

As to this monitor imaging mode, when moving picture mode has been selected with the mode switching dial 26, the mode automatically changes to monitor imaging mode. Even when the moving picture imaging button 35 has been pressed, the mode automatically changes to monitor imaging mode.

In this monitor imaging mode, contrast-type autofocusing, which is based on image data produced by the imaging sensor 11, is used as the focusing method instead of a phase difference detection method in which the focus point detection unit 5 is used. When a contrast method is used as the method for autofocusing in the monitor imaging mode with the display unit 20, precise focusing can be achieved with the camera system. In this monitor imaging mode, contrast autofocusing in which image data is used is easier than a conventional phase difference detection method since image data is produced by the imaging sensor 11 in a steady state.

The autofocusing operation by contrast method will now be described.

When performing autofocusing by contrast method, the body microcomputer 10 requests contrast AF-use lens information of the lens microcomputer 40. This contrast AF-use lens information is data that is necessary in autofocusing by contrast method, and includes, for example, the focus drive speed, the amount of focus shift, the zoom ratio, and whether or not contrast autofocus is possible.

The body microcomputer 10 periodically produces a vertical synchronization signal. The body microcomputer 10 produces an exposure synchronization signal in parallel with this on the basis of the vertical synchronization signal. This allows an exposure synchronization signal to be produced because the body microcomputer 10 ascertains ahead of time the exposure start and end timing, using the vertical synchronization signal as a reference. The body microcomputer 10 outputs the vertical synchronization signal to a timing generator (not shown), and outputs the exposure synchronization signal to the lens microcomputer 40. The lens microcomputer 40 synchronizes with the exposure synchronization signal and acquires position information about the second lens group L2.

The imaging sensor drive controller 12 periodically produces an electronic shutter drive signal and the read signal of the imaging sensor 11 on the basis of the vertical synchronization signal. The imaging sensor drive controller 12 drives the imaging sensor 11 on the basis of the electronic shutter drive signal and the read signal. Specifically, the imaging sensor 11 reads to a vertical transmitter (not shown) the image data produced by numerous opto-electrical conversion elements (not shown) present in the imaging sensor 11, according to the read signal.

In still picture imaging mode, the user presses the release button 30 half-way down, and the body microcomputer 10 of the camera system 1 receives various kinds of lens information from the lens microcomputer 40 in the interchangeable lens unit 2 via the lens mount 79 and the body mount 4, and this information is stored in the built-in memory 38. Also, the body microcomputer 10 sends an autofocus start command to the lens microcomputer 40. When the release button 30 is pressed down half-way, the autofocus start command is a command to start the autofocusing operation by contrast method. On the basis of this command, the lens microcomputer 40 controls the drive of the second lens group L2 in the direction along the optical axis AZ. The body microcomputer 10 calculates an evaluation value for use in autofocusing (hereinafter referred to as the AF evaluation value) on the basis of the received image data. More specifically, there is a known method in which a brightness signal is found from the image data produced by the imaging sensor 11, the high-frequency part of the brightness signal on the screen is added up, and the AF evaluation value is found. The calculated AF evaluation value is stored in a DRAM (not shown) in a state of being associated with the exposure synchronization signal. The lens position information acquired from the lens microcomputer 40 is also associated with the exposure synchronization signal. Accordingly, the body microcomputer 10 can store the AF evaluation value in association with lens position information.

Next, the body microcomputer 10 finds the contrast peak on the basis of the AF evaluation value stored in the DRAM, and monitors whether or not the focus point has been selected. More specifically, the position of the second lens group L2 at which the AF evaluation value is at its maximum value is selected as the focus point. This lens drive method is commonly known as the mountain climbing method.

In this state, the camera system 1 displays the image data produced by the imaging sensor 11 as a through-image (what is known as a live view image) on the display unit 20. Since this through-image is displayed on the display unit 20, the user can determine the composition for capturing a still picture while looking at the display unit 20.

After this, when the user presses the release button 30 all the way down, the body microcomputer 10 directs that the aperture value be set to the one calculated on the basis of the output from a photometer sensor (not shown). The lens microcomputer 40 then controls the aperture drive controller 42 and stops down the aperture until the indicated aperture value is reached. The imaging sensor drive controller 12 directs that the imaging sensor 11 be driven, and directs that the shutter unit 33 be operated. The imaging sensor drive controller 12 also exposes the imaging sensor 11 for the length of time of the specific shutter speed calculated from the output of the imaging sensor 11.

Upon completion of the exposure, the image data read from the imaging sensor 11 by the imaging sensor drive controller 12 is subjected to specific image processing, after which it is displayed as a captured imaged on the display unit 20. Also, the image data read from the imaging sensor 11 and subjected to the specific image processing is written via the image recorder 18 as image data to a storage medium. Also, upon completion of exposure, the quick return mirror 23 is positioned in a state of being retracted from within the optical axis AZ, so the user can then use the monitor imaging mode to view the subject as a captured image on the display unit 20.

Similarly, in moving picture mode, the user presses the release button 30 all the way down to perform moving picture recording. Regardless of the mode, moving picture recording is possible by pressing the moving picture imaging button 35. Furthermore, if the interchangeable lens unit 2 is compatible with moving picture imaging, the mode may be automatically changed to moving picture mode when the interchangeable lens unit 2 is attached to the camera body 3.

When the monitor imaging mode is to be exited, the user presses the viewfinder switching button 34, and the system changes to the viewfinder imaging mode in which the subject is viewed through the viewfinder eyepiece window 9. When the mode changes to viewfinder imaging mode, the quick return mirror 23 is returned to its specific position in the optical axis AZ. The quick return mirror 23 is also returned to its specific position in the optical axis AZ when the power to the camera system 1 is switched off.

2.5: Determining Moving Picture Imaging Compatibility

Figure 12:
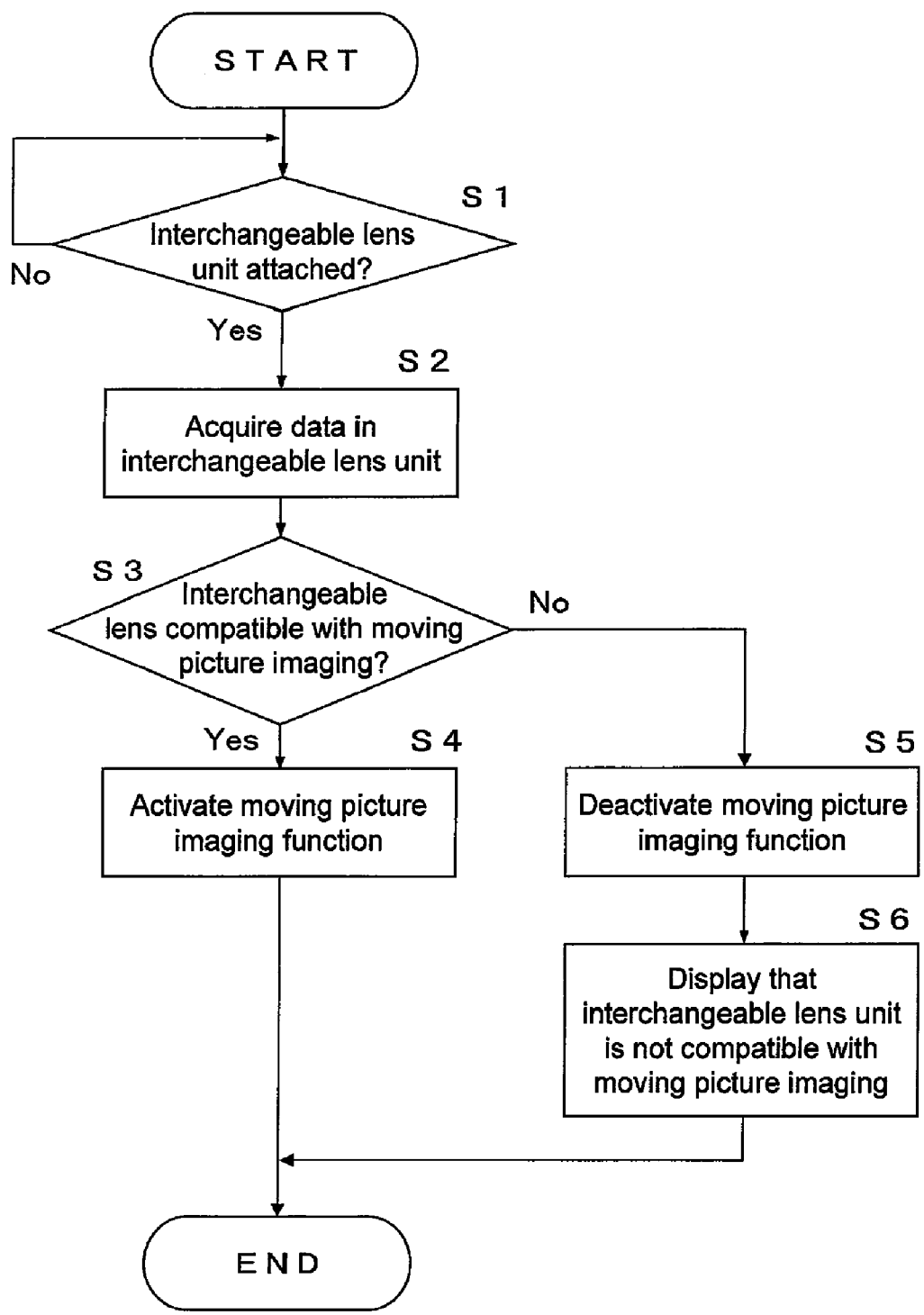
FIG. 12 is a flowchart of deciding whether or not an interchangeable lens unit is capable of moving picture imaging.

To perform moving picture imaging, the camera body 3 determines whether or not the interchangeable lens unit 2 has a moving picture imaging function. The operation of the camera system 1 in determining whether or not moving picture imaging is possible will now be described through reference to FIG. 12. FIG. 12 is a flowchart of this determination operation.

As shown in FIG. 12, the body microcomputer 10 of the camera body 3 determines whether or not the interchangeable lens unit 2 has been attached (S1). If it is determined that the interchangeable lens unit 2 has been attached, the body microcomputer 10 acquires the lens information stored in the memory 44 of the interchangeable lens unit 2 (S2). The body microcomputer 10 determines on the basis of the acquired lens information whether or not the interchangeable lens unit 2 is compatible with moving picture imaging (S3).

This lens information includes information related to whether or not the lens is compatible with moving picture imaging as discussed above. For example, this information is recorded to a specific address in the memory 44 of the lens microcomputer 40 (such as an extra address that is not usually used). More specifically, if the interchangeable lens unit 2 is compatible with moving picture imaging, information indicating that it is compatible with moving picture imaging is recorded to a specific address. On the other hand, if the interchangeable lens unit 2 is not compatible with moving picture imaging, no information to that effect is recorded to any specific address. Therefore, in a state in which a specific address is not being used, it is determined by the body microcomputer 10 that the interchangeable lens unit 2 is not compatible with moving picture imaging.

If the mounted interchangeable lens unit 2 is compatible with moving picture imaging, the moving picture imaging function is activated by the body microcomputer 10 (S4). Specifically, when the moving picture imaging mode is selected with the mode switching dial 26, the body microcomputer 10 enables moving picture imaging and does not restrict the setting of the operating mode to the moving picture imaging mode. Moving picture imaging can be started and stopped by pressing the release button 30 all the way down. Moving picture imaging can also be started and stopped by using the moving picture imaging button 35 instead of the release button 30. That is, even if the still picture mode or the reproduction mode has been selected, if the moving picture imaging button 35 is pressed, the mode is forcibly changed to the moving picture mode, which makes it possible to commence moving picture imaging, so moving picture imaging compatibility can be achieved instantly, which enhances ease of operation in moving picture imaging. Also, the fact that moving picture imaging is possible may be displayed on the display unit 20 when the interchangeable lens unit 2 is attached to the camera body 3.

Conversely, if the interchangeable lens unit 2 is not compatible with moving picture imaging, the body microcomputer 10 deactivates the moving picture imaging function (S5). Specifically, even if the moving picture mode has been selected with the mode switching dial 26, the body microcomputer 10 gives priority to a decision based on lens information, and restricts switching to the moving picture mode. The fact that the mounted interchangeable lens unit 2 is not compatible with moving picture imaging may be displayed on the display unit 20 (S6). The fact that the interchangeable lens unit 2 is not compatible with moving picture imaging may also be displayed when the moving picture imaging button 35 is pressed.

As discussed above, the camera body 3 makes decision as to whether or not moving picture imaging is possible on the basis of imaging stored in the interchangeable lens unit 2 when the interchangeable lens unit 2 is attached.

2.6: Zooming and Focusing

The operation of the interchangeable lens unit 2 when the user performs zooming and focusing will now be described.

Figure 13:
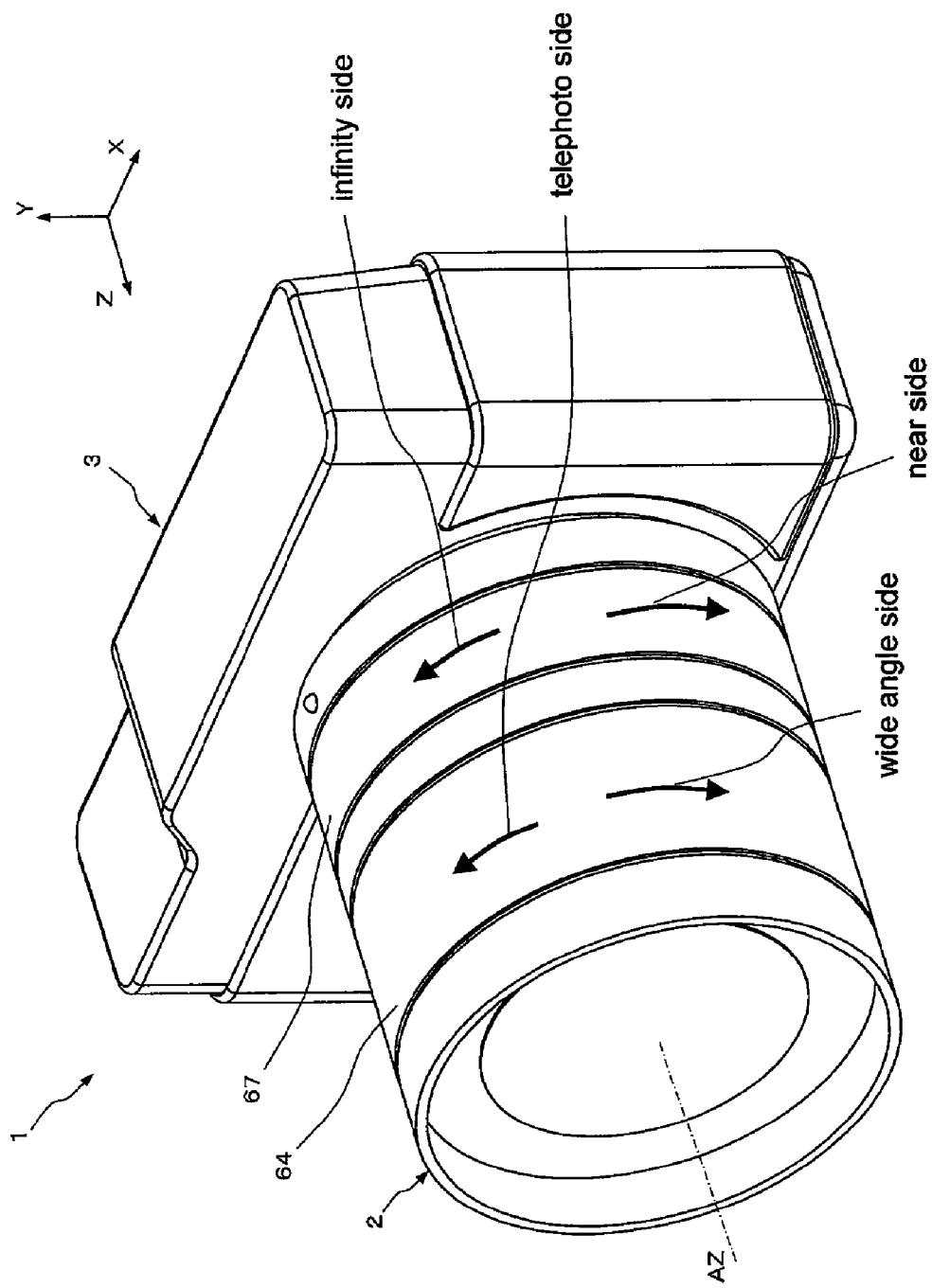
FIG. 13 is a simplified oblique view of a camera system.

As shown in FIG. 13, when the user turns the zoom ring 64, this turning motion is transmitted to the first rotary frame 53 linked to the zoom ring 64. When the first rotary frame 53 rotates around the optical axis AZ, the first rotary frame 53 is guided by the cam though-grooves 50b of the fixed frame 50, and the first rotary frame 53 moves in the Z axis direction while rotating around the optical axis AZ. Also, the first linear frame 52 rotates with respect to the first rotary frame 53 (without rotating with respect to the fixed frame 50), while moving linearly in the Z axis direction integrally with the first rotary frame 53.

When the first rotary frame 53 rotates around the optical axis AZ, the cam pins 54a are guided by the through-cam groove 53a, and the first holder 54 and the first lens support frame 57 fixed to the first holder 54 move linearly in the Z axis direction. Also, when the first rotary frame 53 rotates around the optical axis AZ, the cam pins 61a are guided by the through-cam grooves 53b, and the second holder 61 and the second lens support frame 58 move integrally and linearly in the Z axis direction. That is, the focus lens unit 78 moves in the Z axis direction.

When the first rotary frame 53 rotates around the optical axis AZ, the cam pins 55a are guided by the through-cam grooves 50b, and as the second rotary frame 55 rotates around the optical axis AZ, it moves in a direction along the optical axis AZ.

When the second rotary frame 55 rotates around the optical axis AZ, the cam pins 59a are guided by the linear through-grooves 50a, and the third lens support frame 59 moves in a direction parallel to the optical axis AZ. Also, when the third lens support frame 59 rotates around the optical axis AZ, the cam pins 60a are guided by cam grooves 60b, and the fourth lens support frame 60 moves in a direction along the optical axis AZ.

Figure 5:
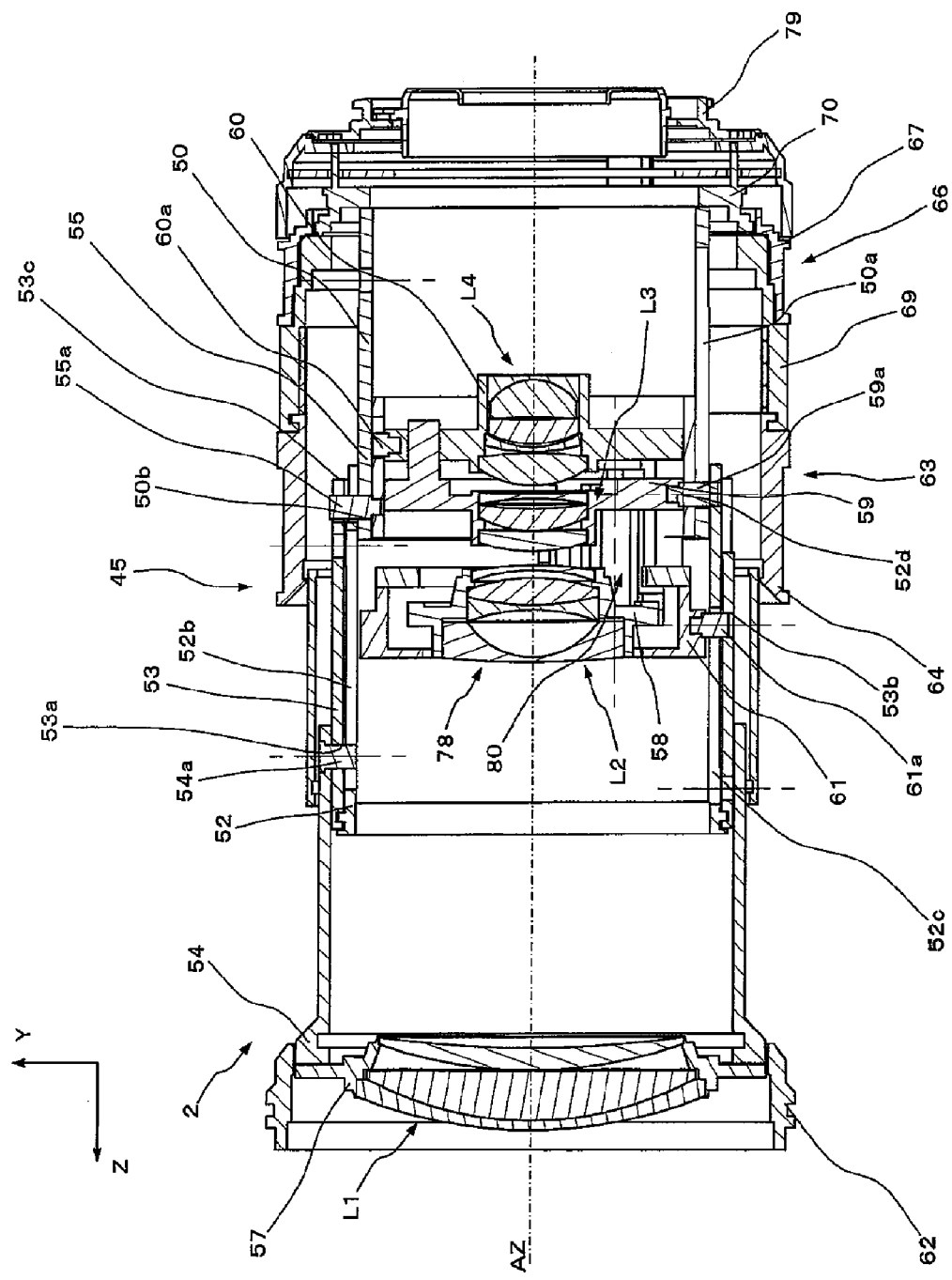
FIG. 5 is a cross section at the telephoto end of an interchangeable lens unit.

Thus, by turning the zoom ring 64 toward the telephoto side, it is possible to move the various lens groups L1 to L4 in a direction along the optical axis AZ, from the wide angle end state shown in FIG. 4 to the telephoto end state shown in FIG. 5, and capture an image at a specific zoom position.

Here, the focus lens unit 78 moves in a direction along the optical axis AZ as the zoom ring 64 rotates. Further, the second lens group L2 performs contrast detection on the basis of the output of the imaging sensor 11, so the focus state is maintained at infinity even if drive of the ultrasonic actuator unit 80 changes focus from the wide angle end to the telephoto end, or conversely from the telephoto end to the wide angle end, from a state of being focused at infinity. In other words, when the zoom ring 64 is turned, the focus lens unit 78 moves in the Z axis direction along with the movement of the first rotary frame 53 and first linear frame 52, and only the second lens group L2 out of the focus lens unit 78 is electrically driven by the ultrasonic actuator unit 80 so that the optimal focus state will be obtained. The operation of the ultrasonic actuator unit 80 is electrically controlled on the basis of a tracking table stored ahead of time in the interchangeable lens unit 2. This tracking table is stored ahead of time in the memory 44 in the lens microcomputer 40. More specifically, the relationship between information about the rotational position of the zoom ring 64 and information about the position of the second lens group L2 referenced to the lens mount 79 in the Z axis direction in the interchangeable lens unit 2 is stored in the memory 44 as table information for each subject distance. For instance, tracking information is stored for subject distances of 0.3 m, 1 m, and ∞ (infinity). The zoom ring 64 rotational position information makes use of the output from the first angle detector 65. For example, in a state of focus at a short distance of 1 m, whether the system is changed from the wide angle end to the telephoto end, or conversely from the telephoto end to the wide angle end, the focus state will be maintained at a short distance by electrical drive of the second lens group L2 by the ultrasonic actuator unit 80 on the basis of the tracking table, so the zooming operation can be carried out smoothly.

When the user turns the focus ring 67, the second angle detector 68 detects the rotational angle, and outputs a signal corresponding to this rotational angle. The lens microcomputer 40 produces a drive signal for driving the ultrasonic actuator unit 80 on the basis of the focus ring rotational angle signal. This drive signal causes the ultrasonic actuator unit 80 to move in the Z axis direction, so the second lens support frame 58 to which the ultrasonic actuator unit 80 is fixed also moves in the Z axis direction. In the wide angle end state shown in FIG. 4, the second lens group L2 is in a position where the distance to the subject is infinity, but as the distance to the subject is shortened, the second lens group L2 moves to the Z axis direction positive side. Similarly, in the telephoto end state shown in FIG. 5, the second lens group L2 is in a position where the distance to the subject is infinity, but as the distance to the subject is shortened, the second lens group L2 moves to the Z axis direction positive side. In this case, the amount of movement of the second lens group L2 is greater than in the case of the wide angle end.

The focus lens group drive controller 41 is able to receive signals from the second angle detector 68, and is able to transmit signals to the ultrasonic actuator unit 80. The focus lens group drive controller 41 sends the determination result to the lens microcomputer 40. The focus lens group drive controller 41 also drives the ultrasonic actuator unit 80 on the basis of a control signal from the lens microcomputer 40.

2.7: Focusing Operation

The focusing operation of the camera system 1 will now be described. The camera system 1 has two focus modes: an autofocus imaging mode and a manual imaging mode.

The user sets the desired imaging mode by using the auto imaging mode or manual imaging mode setting button (not shown) provided to the camera body 3 or the interchangeable lens unit 2.

In auto imaging mode, the lens microcomputer 40 sends a control signal to the focus lens group drive controller 41 according to operation of the moving picture imaging button 35 or to the release button 30 being pressed half-way down, drives the ultrasonic actuator unit 80, and nudges the second lens group L2. The body microcomputer 10 sends a command to the digital signal processor 15. The digital signal processor 15 sends an image signal at a specific timing to the body microcomputer 10 on the basis of the received command. The body microcomputer 10 computes the amount of movement along the optical axis AZ of the second lens group L2 that will result in the imaging optical system L being in a focused state on the basis of the received image signal and focal length information received ahead of time from the zoom ring unit 63. The body microcomputer 10 produces a control signal on the basis of the computation result. The body microcomputer 10 sends this control signal to the focus lens group drive controller 41.

The focus lens group drive controller 41 produces a drive signal for driving the ultrasonic actuator unit 80 on the basis of the control signal from the body microcomputer 10. The ultrasonic actuator unit 80 is driven on the basis of this drive signal. Drive of the ultrasonic actuator unit 80 moves the second lens group L2 automatically in the Z axis direction.

As discussed above, focusing is carried out by the autofocus imaging mode of the interchangeable lens unit 2 or the camera body 3. The above operation is executed instantly after the user presses the release button 30 half-way down, or presses the moving picture imaging button 35. If the user presses the release button 30 all the way down, or presses the moving picture imaging button 35, the body microcomputer 10 executes imaging processing, and when this imaging is complete, a control signal is sent to the image recording controller 19. The image recorder 18 records the image signal to an internal memory and/or removable memory on the basis of a command from the image recording controller 19. The image recorder 18 records information to the effect that the imaging mode is the autofocus imaging mode, along with the image signal, to an internal memory and/or removable memory on the basis of a command from the image recording controller 19.

On the other hand, in manual focus imaging mode, the lens microcomputer 40 asks the focus lens group drive controller 41 for information about the rotational angle of the focus ring unit 66. The lens microcomputer 40 produces a control signal for moving the second lens group L2 on the basis of a detection value obtained from the rotational angle of the focus ring 67. The lens microcomputer 40 sends the control signal thus produced to the focus lens group drive controller 41.

The focus lens group drive controller 41 produces a drive signal for driving the ultrasonic actuator unit 80 on the basis of the control signal from the lens microcomputer 40. The ultrasonic actuator unit 80 is driven on the basis of this drive signal. Drive of the ultrasonic actuator unit 80 moves the second lens group L2 in the Z axis direction according to the amount and direction of rotation of the focus ring 67.

As discussed above, focusing is carried out by the manual focus imaging mode of the camera system 1. In manual focusing mode, imaging is performed in the same state when the user presses the release button 30 half-way down, or presses the moving picture imaging button 35.

Upon completion of the imaging, the body microcomputer 10 sends a control signal to the image recording controller 19. The image recorder 18 records an image signal to an internal memory and/or removable memory on the basis of the command from the image recording controller 19. The image recorder 18 records information to the effect that the photography mode is the manual focus photography mode, along with the image signal, to an internal memory and/or removable memory on the basis of the command from the image recording controller 19.

3: Features of Camera System

As described above, with this camera system 1, the body microcomputer 10 decides whether or not the interchangeable lens unit 2 is compatible with moving picture imaging on the basis of information stored in the memory 44 of the interchangeable lens unit 2. The body microcomputer 10 automatically switches the moving picture imaging function of the camera body 3 on and off on the basis of this decision result. Consequently, even if the interchangeable lens unit 2 is not compatible with moving picture imaging, system mismatching can be prevented between the interchangeable lens unit 2 and the camera body 3, and the interchangeable lens unit 2 can be utilized more effectively. Specifically, the utility value of the camera system 1 can be enhanced.

Second Embodiment

Figure 14:
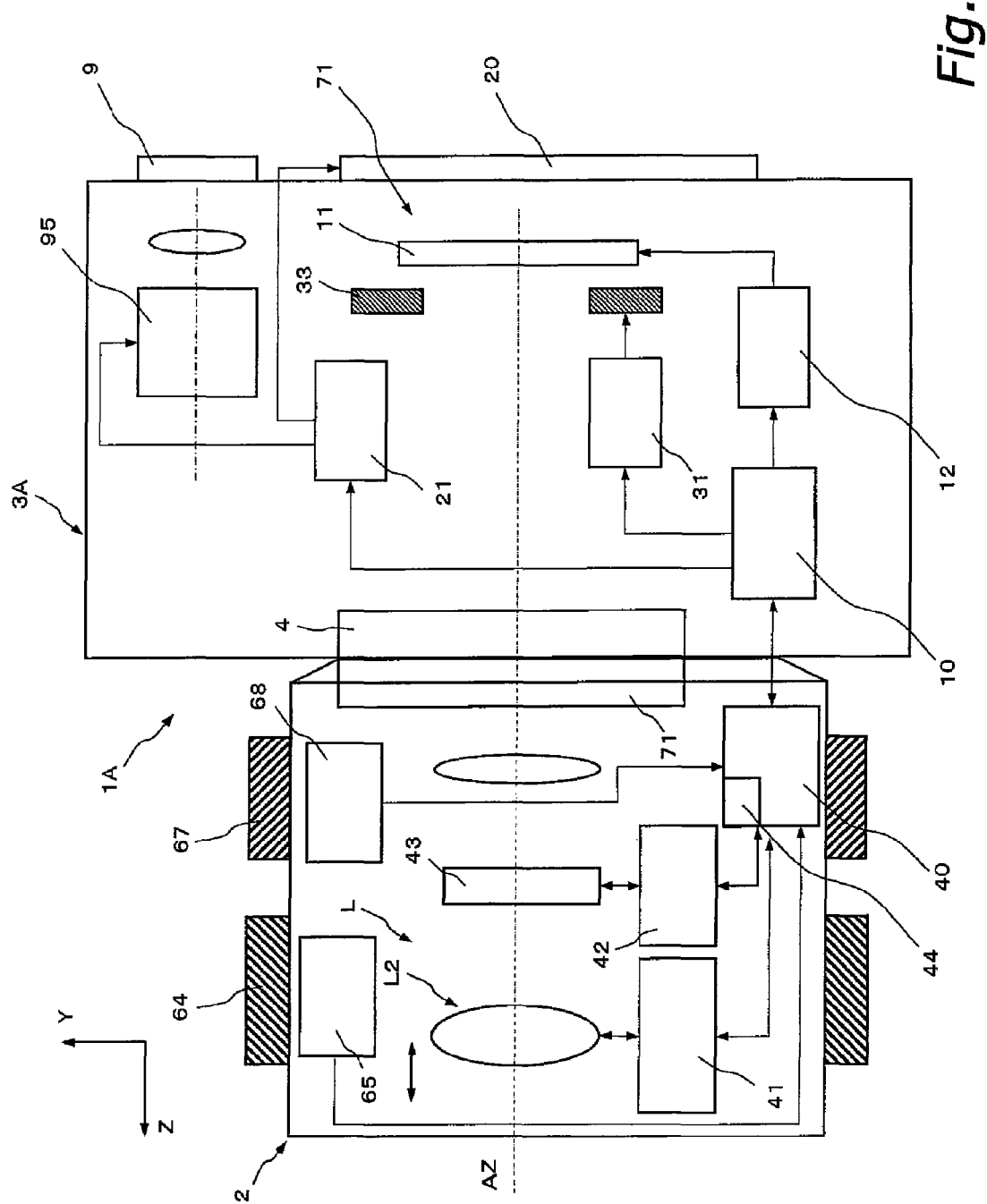
FIG. 14 is a block diagram of the constitution of a camera system (second embodiment).

In the first embodiment the quick return mirror 23 was employed, but if focusing is possible by contrast detection method, then the quick return mirror 23 can be omitted. A camera system 1A according to a second embodiment will be described through reference to FIG. 14. FIG. 14 is a block diagram of the configuration of the camera system 1A. Those parts having substantially the same function as shown in FIG. 1 will be numbered the same and not described again.

1: Overall Configuration of Camera System

In FIG. 14, the camera system 1A is a digital camera system with an interchangeable lens, and mainly comprises a camera body 3A having the main functions of the camera system 1A, and an interchangeable lens unit 2 that is removably mounted to the camera body 3A. The interchangeable lens unit 2 is mounted via the lens mount 79 to the body mount 4 provided to the front face of the camera main body 3A.

The camera body 3A shown in FIG. 14 differs from the camera body 3 shown in FIG. 1 in that the quick return mirror 23 for guiding incident light from the imaging unit 71 to the viewfinder optical system 22 and focus point detection unit 5 is omitted, and in its place is provided an electronic viewfinder 95, such as a liquid crystal viewfinder. An image signal recorded to the image recorder 18 or the buffer memory 16 can be displayed as a visible image on this electronic viewfinder 95 on the basis of a command from the image display controller 21. Consequently, even though there is no quick return mirror 23, an optical image of the subject formed by the imaging optical system L can be viewed through the viewfinder eyepiece window 9.

2: Features of Camera System (1)

With this camera system 1A, just as with the camera system 1 discussed above, the body microcomputer 10 decides whether or not the interchangeable lens unit 2 is compatible with moving picture imaging. Therefore, by identifying whether or not the interchangeable lens unit 2 is compatible with moving picture imaging on the basis of information in the interchangeable lens unit 2, even if the interchangeable lens unit 2 is not compatible with moving picture imaging, mismatching between the interchangeable lens unit 2 and the camera body 3A can be prevented, and the interchangeable lens unit 2 can be utilized more effectively. Specifically, the utility value of the camera system 1A can be enhanced.

Furthermore, even if the interchangeable lens unit 2 is not compatible with moving picture imaging, still picture imaging will still be possible. For example, if the interchangeable lens unit 2 is compatible with only phase difference detection, it is conceivable that wobbling will be impossible at high speed, as with moving picture imaging. In this case, in autofocus imaging mode, there is the risk that the focusing will be slow, but focusing by contrast detection method will be possible by acquiring an image while moving the second lens group L2 in a direction along the optical axis AZ. In manual focus imaging mode, focusing can be performed manually by operating the focus ring 67 of the focus ring unit 66. Therefore, even if the camera body 3A is not compatible with a phase difference detection type of autofocus function, and the interchangeable lens unit 2 is not compatible with moving picture imaging, still picture imaging will still be possible.

(2)

With this camera system 1A, since the viewfinder optical system 22 and the quick return mirror 23 are omitted, the camera body 3A can be thinner in a direction along the optical axis AZ. Furthermore, since the distance from the lens at the rearmost part of the interchangeable lens unit 2 to the imaging sensor 11 (lens back) can be shorter, so the interchangeable lens unit 2 can be more compact.

(3)

With this camera system 1A, when the interchangeable lens unit 2 is compatible with moving picture imaging, a contrast method based on image data constantly produced by the imaging sensor 11 can be used as the focus point detection method in the camera body 3A in FIG. 14. Consequently, more accurate focusing can be achieved.

(4)

With this camera system 1A, since the quick return mirror 23 does not need to be opened and closed, the focusing operation can be carried out faster, more quietly, and so on, and this system can easily accommodate not only still picture imaging, but also moving picture imaging.

Other Embodiments

Embodiments of the present invention are not limited to the embodiments given above, and various modifications and changes are possible without departing from the gist of the invention.

(1)

In the above embodiment, the focal length was manually adjusted with a zoom ring, but the present invention is not limited to this, and a power zoom may be used instead.

(2)

In the above embodiment, the various setting menus for moving picture imaging can be set using the display unit on the basis of whether or not moving picture imaging is possible with the interchangeable lens unit.

(3)

In the above embodiment, an ultrasonic actuator was used as the actuator for focusing, but this may be another actuator that allows the focus lens group to be directly driven, such as a stepping motor.

(4)

In the above embodiment, the focus lens group was the second lens group L2, but the present invention is not limited to this, and it may instead be the third lens group L3, the fourth lens group L4, or another lens group. Also, a case was described in which there was only one second lens group L2 as the focus lens group, but a plurality of lens groups may work together to constitute an optical system that performs focusing.

(5)

An image blur correction unit may be provided to the interchangeable lens unit 2, to the camera body 3, or to both. If to both, the camera system may be such that either image blur correction unit can be selected.

(6)

In this embodiment, the exposure time of the imaging sensor was controlled by operating the shutter, but the present invention is not limited to this, and the exposure time of the imaging sensor may instead be controlled by an electronic shutter or the like.

(7)

In this embodiment, the lens information includes information about whether or not there is compatibility with moving picture imaging. However, whether or not there is compatibility with moving picture imaging may be decided from whether or not the drive system of the second lens focus lens group, or the focus lens group drive controller 41 or the like, is compatible with contrast detection.

(8)

In the above embodiment, a two-part operating method comprising "pressing the release button 30 all the way down after selecting the moving picture mode with the mode switching dial 26" and "pressing the moving picture imaging button 35." However, if we take into account the user's convenience, it may be better for the operating system to comprise just one part, in which case the moving picture mode is eliminated from the mode switching dial 26, and is left on just the moving picture imaging button 35. In this case, the change to the moving picture mode is less complicated, which makes the camera even easier to operate.

(9)

In the above embodiment, the interchangeable lens unit 2 was compatible with moving picture imaging. However, as mentioned above, there may be cases in which only the camera body 3 is compatible with moving picture imaging and the interchangeable lens unit 2 is not compatible with moving picture imaging.

INDUSTRIAL APPLICABILITY

With the camera system and camera body discussed above, because the above-mentioned constitution is employed, the system is more convenient to use. Therefore, the camera system and camera body can be used to advantage in digital still cameras, digital video cameras, portable telephones with a camera function, PDAs, and so forth that are interchangeable lens digital cameras with a moving picture imaging function.

The invention claimed is:

1. A camera system, comprising:
an interchangeable lens unit having an imaging optical system configured to forming an optical image of a subject, a focus adjuster configured to optically adjust the focus state of the optical image, and a lens controller configured to control the operation of the focus adjuster; and
a camera body having an imaging unit configured to convert an optical image of the subject into an image signal and configured to acquire an image of the subject, a focus detector configured to detect the focus state of the optical image by contrast detection method on the basis of the image signal, a control interface with which control information can be inputted from the outside, and a body controller controlling the operation of the imaging unit and with which information can be exchanged with the lens controller,
wherein the lens controller has lens information related to the interchangeable lens unit,
the lens information includes information related to whether or not the interchangeable lens unit is compatible with a moving picture mode,
the body controller has a decision part configured to decide whether or not the interchangeable lens unit is compatible with the moving picture mode on the basis of the lens information, and a mode switching controller with which the operation of the imaging unit can be set to either still picture mode or moving picture mode on the basis of the decision result of the decision part or the control information, and
if the decision part decides that the interchangeable lens unit is not compatible with the moving picture mode, the mode switching controller prevents the operation of the imaging unit from being set to the moving picture mode regardless of the control information.

2. The camera system according to claim 1,
wherein information related to whether or not the interchangeable lens unit is compatible with a moving picture mode includes at least one of information related to whether or not the focus adjuster is compatible with a contrast detection method and information related to the method for driving the focus adjuster.

3. The camera system according to claim 2,
wherein the camera body has a first display unit with which an image acquired by the imaging unit can be displayed,
the body controller has a display controller configured to control the operation of the first display unit, and
if the decision part decides that the interchangeable lens unit is not compatible with the moving picture mode, the display controller displays that the interchangeable lens unit is not compatible with the moving picture mode.

4. The camera system according to claim 3,
wherein the camera body has a second display unit with which an image acquired by the imaging unit can be displayed, and a viewfinder arranged to guides the image displayed by the second display unit to the outside.

5. A camera body that is used in a camera system along with an interchangeable lens unit having an imaging optical system configured to form an optical image of a subject, a focus adjuster configured to optically adjust the focus state of the optical image, and a lens controller configured to control the operation of the focus adjuster, the camera body comprising:

an imaging unit configured to convert an optical image of the subject into an image signal and configured to acquire an image of the subject;

a focus detector configured to detect the focus state of the optical image by contrast detection method on the basis of the image signal;

a control interface with which control information can be inputted from the outside; and a body controller configured to control the operation of the imaging unit and with which information can be exchanged with the lens controller, wherein the lens controller has lens information related to the interchangeable lens unit, the lens information includes information related to whether or not the interchangeable lens unit is compatible with a moving picture mode, the body controller has a decision part configured to decide whether or not the interchangeable lens unit is compatible with the moving picture mode on the basis of the lens information, and a mode switching controller with which the operation of the imaging unit can be set to either still picture mode or moving picture mode on the basis of the decision result of the decision part or the control information, and if the decision part decides that the interchangeable lens unit is not compatible with the moving picture mode, the mode switching controller prevents the operation of the imaging unit from being set to the moving picture mode regardless of the control information.

6. The camera body according to claim 5, wherein information related to whether or not the interchangeable lens unit is compatible with a moving picture mode includes at least one of information related to whether or not the focus adjuster is compatible with a contrast detection method and information related to the method for driving the focus adjuster.

7. The camera body according to claim 6, further comprising a first display unit with which an image acquired by the imaging unit can be displayed, wherein the body controller has a display controller configured to control the operation of the first display unit, and if the decision part decides that the interchangeable lens unit is not compatible with the moving picture mode, the display controller displays that the interchangeable lens unit is not compatible with the moving picture mode.

8. The camera body according to claim 7, further comprising a second display unit with which an image acquired by the imaging unit can be displayed, and a viewfinder arranged to guide the image displayed by the second display unit to the outside.

* * * * *